United States Patent
Li et al.

(10) Patent No.: US 12,499,777 B1
(45) Date of Patent: Dec. 16, 2025

(54) SPEECH RECOGNITION FOR LANGUAGE LEARNING SYSTEMS

(71) Applicant: Amazon Technologies, Inc., Seattle, WA (US)

(72) Inventors: Jie Li, Bothell, WA (US); Pralam Shah, Bothell, WA (US); Hans Hoeijmakers, San Jose, CA (US); Soumya Saha, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 18/192,093

(22) Filed: Mar. 29, 2023

(51) Int. Cl.
| | |
|---|---|
| G09B 5/00 | (2006.01) |
| G09B 7/02 | (2006.01) |
| G09B 19/06 | (2006.01) |
| G10L 15/00 | (2013.01) |
| G10L 15/18 | (2013.01) |
| G10L 15/187 | (2013.01) |
| G10L 15/22 | (2006.01) |
| G10L 15/30 | (2013.01) |

(52) U.S. Cl.
CPC ............... G09B 5/00 (2013.01); G09B 19/06 (2013.01); G10L 15/005 (2013.01); G10L 15/1815 (2013.01); G10L 15/187 (2013.01); G10L 15/22 (2013.01); G09B 7/02 (2013.01); G10L 2015/225 (2013.01); G10L 15/30 (2013.01)

(58) Field of Classification Search
CPC .. G09B 5/00; G09B 19/06; G09B 7/02; G10L 15/005; G10L 15/1815; G10L 15/187; G10L 15/22; G10L 15/30; G10L 2015/225
See application file for complete search history.

(56) References Cited

U.S. PATENT DOCUMENTS

| | | | | |
|---|---|---|---|---|
| 6,134,529 A * | 10/2000 | Rothenberg | ........... | G09B 19/04 434/167 |
| 7,433,819 B2 * | 10/2008 | Adams | ..................... | G09B 5/04 434/362 |
| 8,109,765 B2 * | 2/2012 | Beattie | ..................... | G09B 5/04 434/179 |
| 8,392,186 B2 * | 3/2013 | Kurzweil | ............... | G09B 5/062 704/235 |
| 9,520,068 B2 * | 12/2016 | Beattie | ................... | G10L 15/26 |
| 11,482,208 B2 * | 10/2022 | Li | ........................ | G10L 15/187 |
| 2006/0058996 A1 * | 3/2006 | Barker | ..................... | G09B 5/04 704/E15.045 |
| 2006/0069562 A1 * | 3/2006 | Adams | ..................... | G09B 5/00 704/E15.04 |

(Continued)

Primary Examiner — Xuan M Thai
Assistant Examiner — Sadaruz Zaman
(74) Attorney, Agent, or Firm — Pierce Atwood LLP

(57) ABSTRACT

Techniques for enabling voice-based language learning are described. A system of the present disclosure supports receipt of speech inputs in a user's native language and a language the user is learning. The system runs an automatic speech recognition (ASR) component configured for transcribing speech in the native language (e.g., English) and runs a phoneme recognition component configured for recognizing phonemes of the learning language (e.g., Spanish). The system can respond to commands provided in the native language (e.g., "Stop lesson", "Repeat lesson", etc.) and provide pronunciation feedback with respect to spoken inputs in the learning language.

20 Claims, 9 Drawing Sheets

(56) References Cited

U.S. PATENT DOCUMENTS

| | | | |
|---|---|---|---|
| 2007/0055514 A1* | 3/2007 | Beattie | G10L 15/08 |
| | | | 704/235 |
| 2018/0137778 A1* | 5/2018 | Ichihashi | G09B 7/02 |
| 2020/0294488 A1* | 9/2020 | Li | G06F 40/242 |
| 2022/0223142 A1* | 7/2022 | Zhang | G10L 15/22 |

* cited by examiner

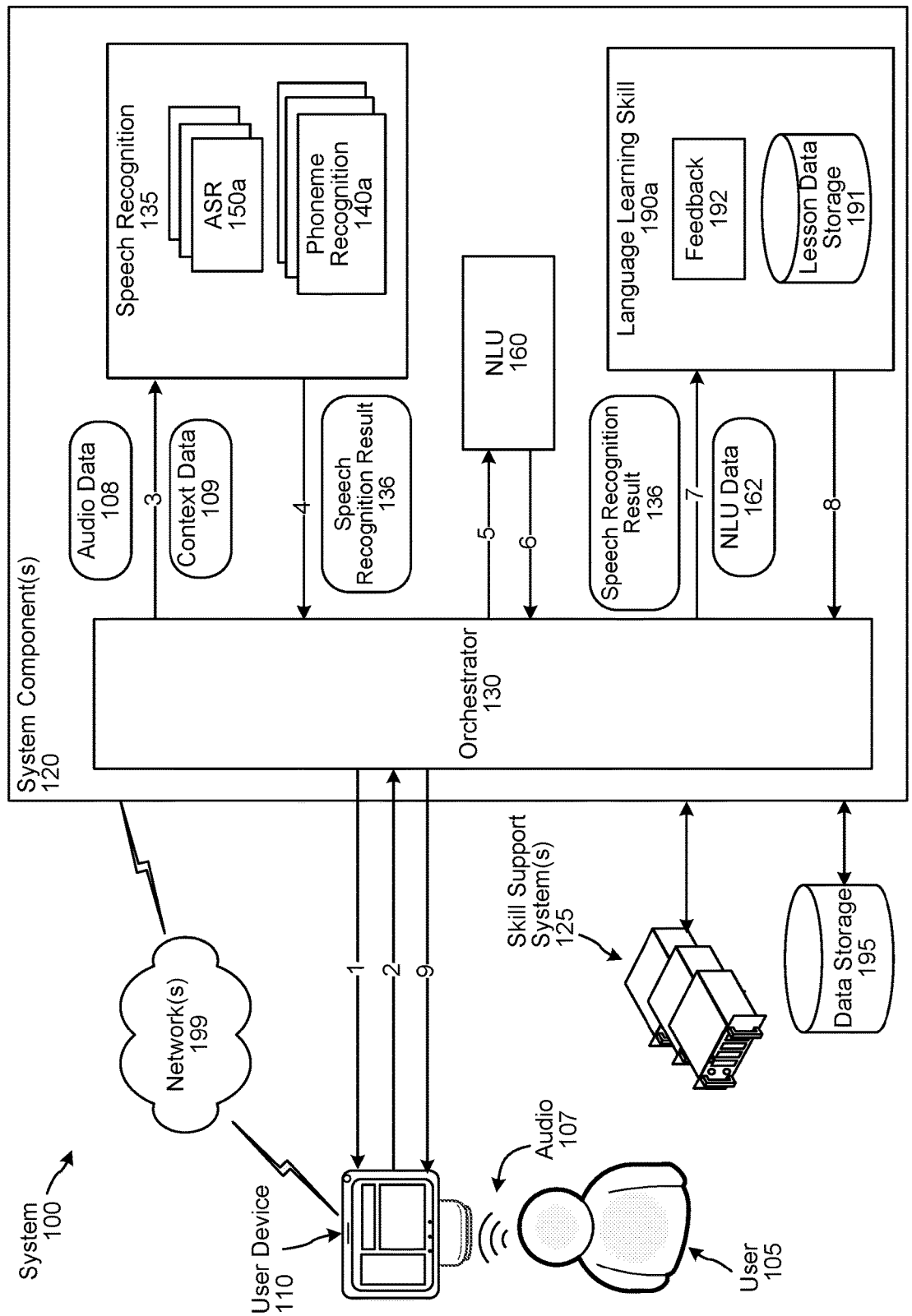

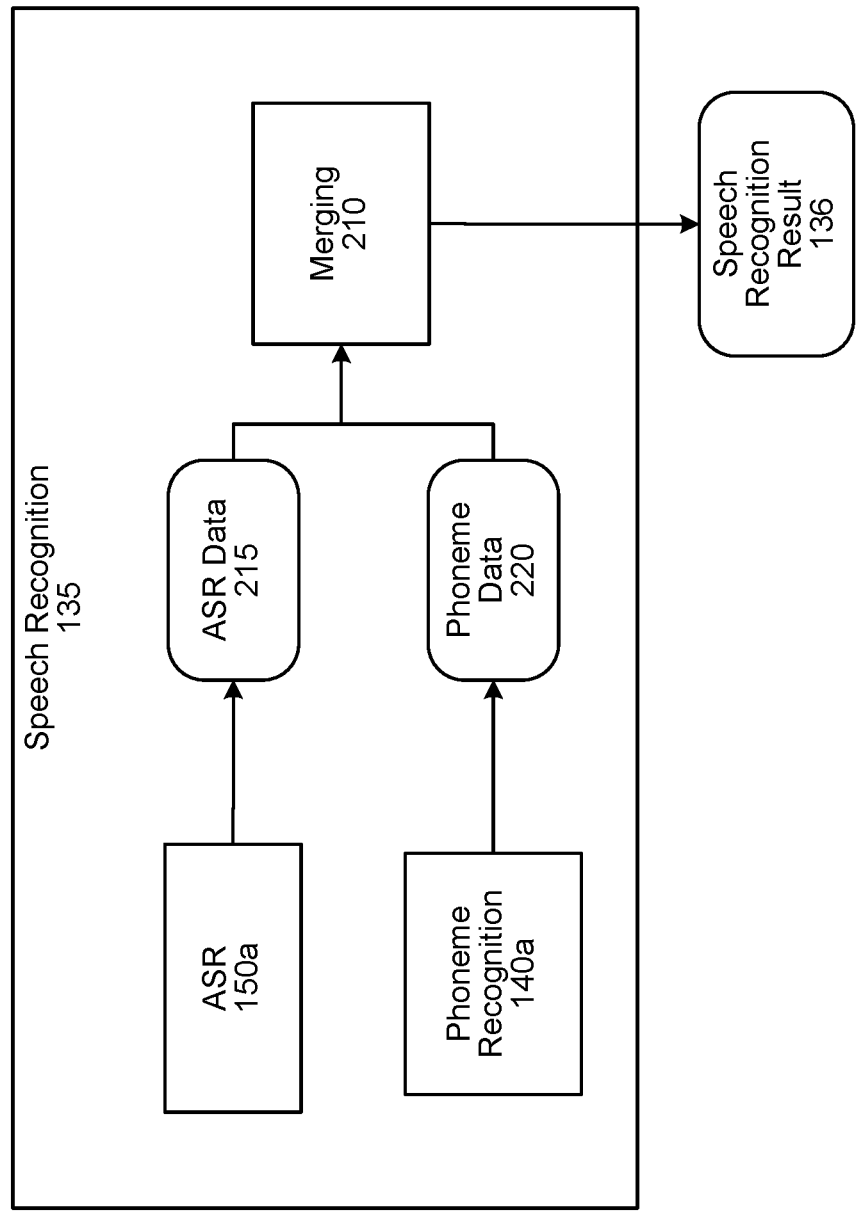

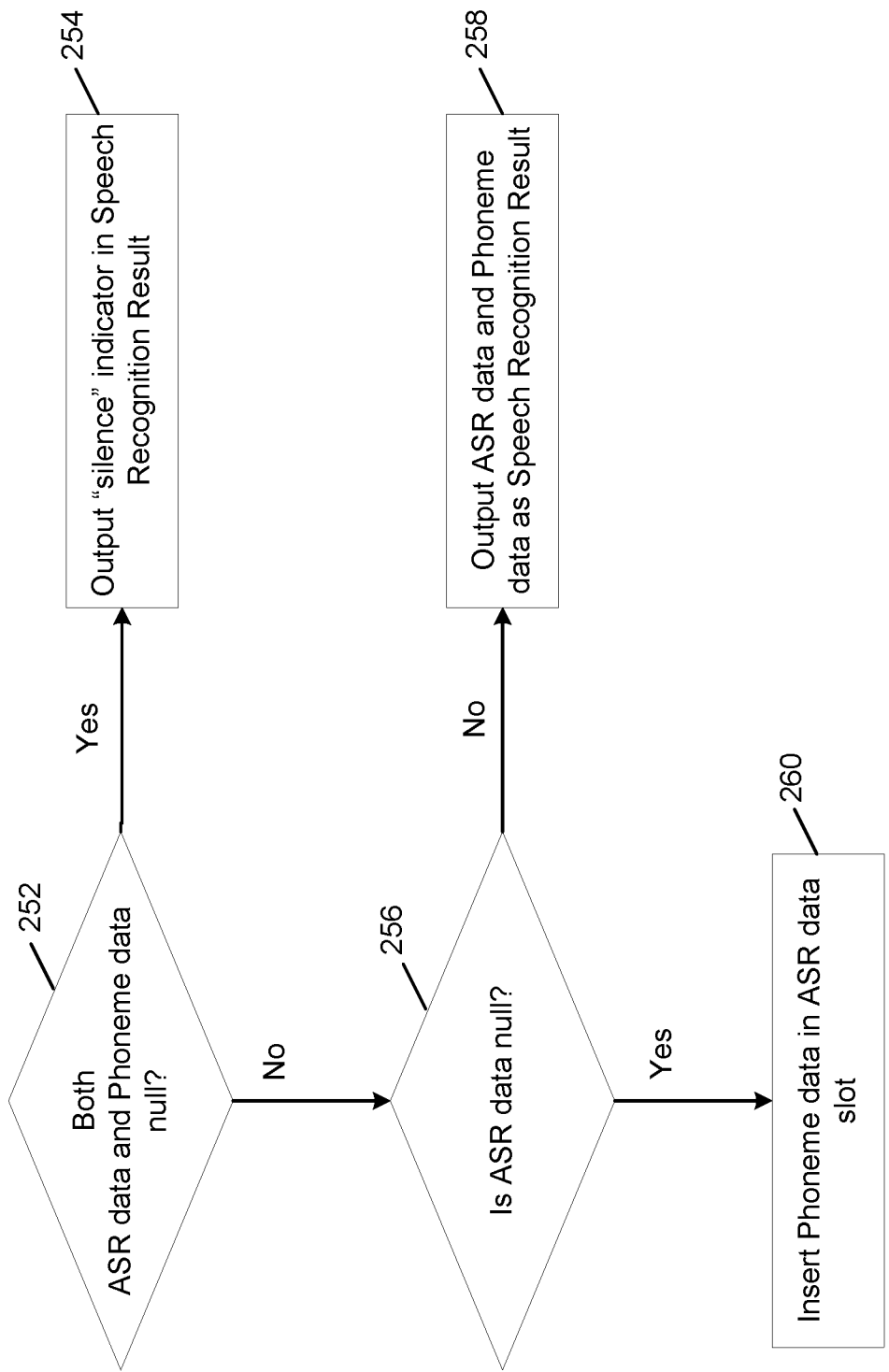

SPEECH RECOGNITION FOR LANGUAGE LEARNING SYSTEMS

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding techniques enable speech-based user control of a computing device to perform tasks based on the user's spoken commands. The combination of speech recognition and natural language understanding processing techniques is referred to herein as spoken language understanding.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system for facilitating language learning via spoken inputs, according to embodiments of the present disclosure.

FIG. 2A is a conceptual diagram of an example speech recognition component, according to embodiments of the present disclosure.

FIG. 2B is a flowchart illustrating an example process that may be performed by the speech recognition component, according to embodiments of the present disclosure.

DETAILED DESCRIPTION

Figure 3:
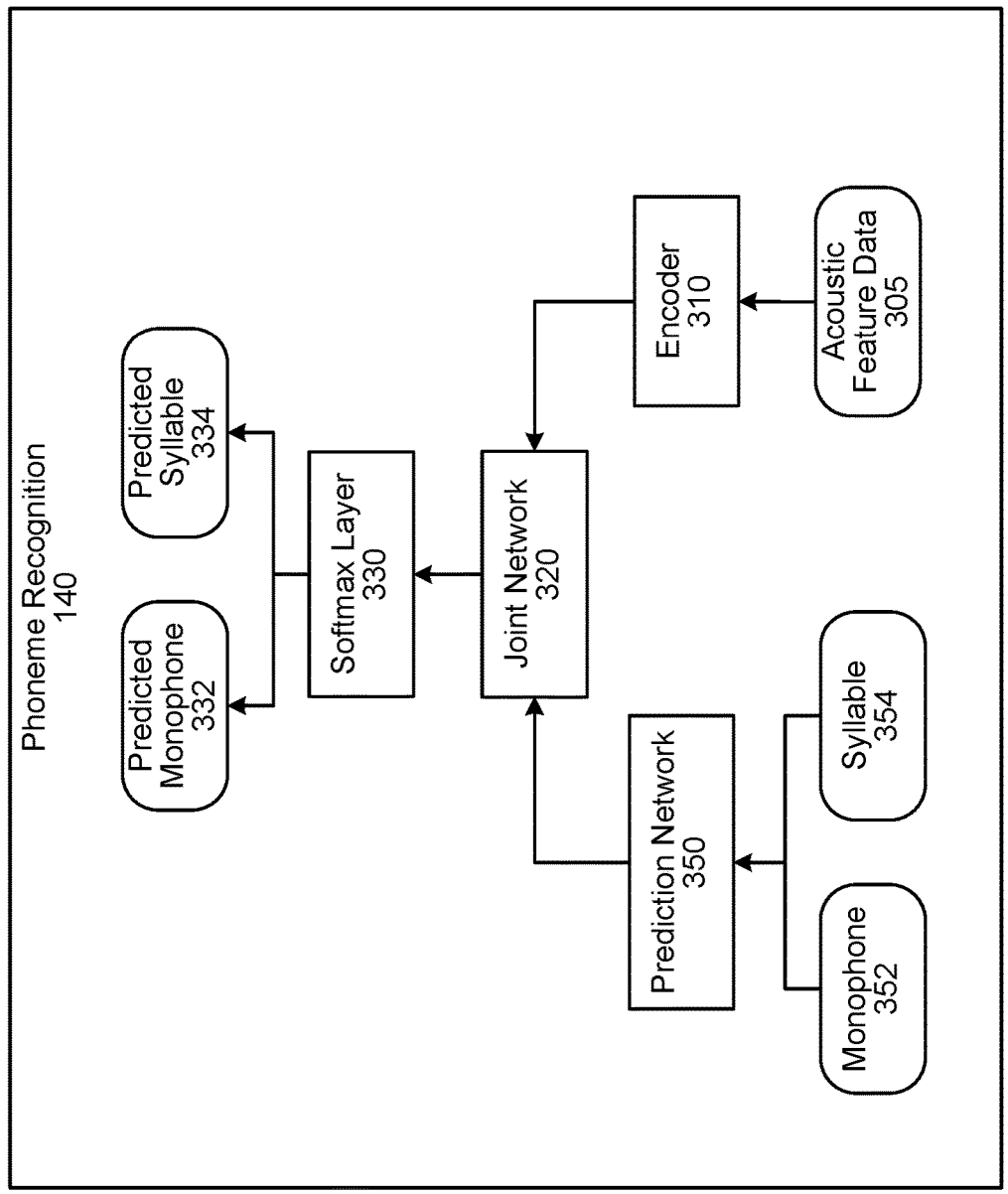
FIG. 3 is a conceptual diagram of an example phoneme recognition component, according to embodiments of the present disclosure.

Automatic speech recognition (ASR) is a field of computer science, artificial intelligence, and linguistics concerned with transforming audio data associated with speech into words (e.g., text, tokens, etc.) representative of that speech. Natural language understanding (NLU) is a field of computer science, artificial intelligence, and linguistics concerned with enabling machines to derive meaning from input containing natural language. Natural language generation (NLG) is a field of artificial intelligence concerned with automatically transforming data into natural language (e.g., English) content. Text-to-speech (TTS) is a field concerning transforming data into audio data that is synthesized to resemble human speech. ASR, NLU, NLG, and TTS may be used together as part of a speech-processing system.

Certain systems may be configured to perform actions responsive to user inputs. For example, for the user input of "Alexa, play music by [artist]," a system may output music sung by the indicated artist. For further example, for the user input of "Alexa, what is the weather in [city]," a system may output synthesized speech representing weather information for the indicated city. In a further example, for the user input of "Alexa, send a message to [recipient]," a system may capture spoken message content and cause the same to be output via a device of the indicated recipient. In the foregoing examples, the actions correspond to outputting music, outputting synthesized speech, and causing spoken message content to be output.

Certain systems may be configured to, among other things, facilitate a user's learning of a language. For example, the system may present words and the user may say the words in the learning language to practice pronunciation. The system can analyze audio of the user's speech, and provide feedback regarding pronunciation. The system may also present other information about the words, such as meanings, sentence usage, etc. so that the user may learn the language.

The present disclosure relates to techniques for enabling voice-based language learning, where a system supports receipt of inputs in different languages. One of the languages being the user's native language and the other language being the language the user is learning (referred to herein as "learning language"). A user device may be set to operate (e.g., receive inputs, provide outputs, etc.) in the user's native language, which is referred to herein as "device language". The system runs an ASR component configured for processing speech inputs in the device language. The system also runs a phoneme recognition component configured for processing speech inputs in the learning language.

Running the ASR component for the device language and the phoneme recognition component for the learning language, enables the system to provide pronunciation feedback with respect to learning language inputs and also respond to language learning skill commands and other system commands (e.g., "Repeat Lesson", "Next Lesson", "Stop", "Alexa start a timer", etc.) in the device language. For example, when a user says words prompted by the language learning skill, the ASR component may generate ASR data indicating an error, since the ASR component is configured to process speech inputs in the device language. Based on this, the system may determine that the user input relates to a pronunciation evaluation intent, and the language learning skill may determine pronunciation feedback. As another example, when a user says a command in the device language, the generated ASR data may include confidence scores indicating that the speech input is in the device language. Based on this, the system may determine a corresponding command intent and perform a corresponding action responsive to the user command.

In some embodiments, the system may include multiple ASR components, where individual ASR components are configured to transcribe speech inputs of different languages. The system may select an ASR component for processing based on it being capable of processing speech inputs of the device language (and optionally tailored to speech of a particular user).

In some embodiments, the system may include multiple phoneme recognition components, where individual phoneme recognition components are configured to generate phonemes for speech inputs of different languages. The system may select a phoneme recognition component for processing based on it being capable of processing speech inputs of the learning language.

In some embodiments, the system may provide phoneme data to a skill component based on the skill component being authorized to receive such data. In some embodiments, the system may run a phoneme recognition component when a skill component authorized to receive phoneme data is in-focus for a user input.

The present disclosure provides an improved user experience. Specifically, teachings of the present disclosure can support voice-based language learning by supporting voice commands provided in one language and learning inputs provided in another language, without a user having to provide an additional input to switch between the languages understandable by the system at a given point in time.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

As used herein, a "phoneme" refers to individual units of sound that make up a word. Pronunciation of a word can be represented as a series of phonemes that correspond to the individual units of sound. As used herein, a "monophone" refers to a single phoneme. A monophone is a smallest unit of sound. A "syllable," as used herein, is a unit of pronunciation having one vowel with or without surrounding consonant(s). For example, the word "cat" has three phonemes "c", "a", "t", and one syllable.

FIG. 1 illustrates a system for recognizing phonemes to provide pronunciation feedback, according to embodiments of the present disclosure. As shown in FIG. 1, the system 100 may include a device 110, local to a user 105, and a system component(s) 120 connected across one or more networks 199. The network 199 may include the Internet and/or any other wide or local area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system component(s) 120 may include one or more speech processing components configured to process spoken natural language inputs using ASR and NLU processing. The system component(s) 120 may also be configured to process non-spoken inputs, such as gestures, textual inputs, selection of GUI elements, selection of device buttons, etc. The system component(s) 120 may include multiple components to facilitate user input processing, some of which are described below in relation to FIG. 4.

As shown in FIG. 1, the system component(s) 120 may include an orchestrator component 130, a speech recognition component 135, a NLU component 160 and a language learning skill component 190a. The system components 120 may be in direct, wired or wireless communication, over the network(s) 199, with one another. The orchestrator component 130 may be configured to route data to the appropriate components of the system component(s) 120 to facilitate processing of and responding to a user input.

The system 100 enables a user to learn a language by interacting with the language learning skill component 190a, according to embodiments of the present disclosure. In some cases, the user 105 may say "I want to learn Spanish", "Start language lesson" or other types of invocation phrases to launch the language learning skill component 190a. In other cases, the user 105 may provide another type of input, such as, a touch input, keyboard input, selecting a GUI element (e.g., a button, an icon, etc.), etc. to launch the language learning skill component 190a.

The language learning skill 190a may identify a lesson to begin for the user 105, which may be based on one or more previous lessons completed or started by the user 105, a learning level determined for the user 105, etc. For example, the language learning skill 190a may use data stored at a lesson data storage 191 to determine a lesson that follows the most recent lesson completed by the user 105. As a further example, the language learning skill 190a may determine a previously started lesson that the user 105 has yet to complete. Yet another example, the language learning skill component 190a may determine a first lesson for the user 105 to start learning the language. The language learning skill component 190a may use profile data for the user 105 and stored at a user profile storage 470 (shown in FIG. 4) to determine a lesson.

As used herein, a "lesson" refers to a set of words, phrases, etc. that a user is to learn. In some embodiments, lessons may be organized based on a difficulty level, where lower difficulty lessons may be presented to a user before higher difficulty lessons. A lesson may relate to similar grammatical concepts, similar spellings, similar topics (e.g., words useful for travel, words useful in a restaurant, etc.), etc.

In response to the user input resulting in the language learning skill component 190a being executed, the language learning skill component 190a may determine output data representing a prompt and a word(s), where the prompt may ask the user to speak the word(s). For example, the output data may be "Say these words: [first word], [second word]." In some cases, the output data may include a prompt and a question, where the prompt may ask the user to answer the question. For example, the output data may be "How do you ask for water in Spanish?" or "What do you need to open a door?" The prompt and word(s) or question included in the output data may relate to a lesson and may be presented to illicit responses from the user 105 in the learning language. The output data may be presented as synthesized speech and/or displayed text. For example, the prompt may be presented as synthesized speech, while the word(s) or question may be displayed on the user device 110. As a further example, the prompt and the word(s) or question may be displayed on the user device 110. In some cases, the output data may include word meanings, sentence usage examples for a word(s), indication of a concept being taught (e.g., "at a restaurant," "at a bus station," "in school"), etc.

The language learning skill component 190a may send the output data to the orchestrator component 130, which in turn may send (step 1) the output data to the user device 110.

In response to receiving the output data, the user 105 may perform an action, such as say the word(s) or answer the question as prompted via the output data. After presenting the output data, the user device 110 may keep a microphone(s) 620 of the user device 110 open (or activate the microphone(s) 620 in the situation where the microphone(s) 620 is not open when the output data is presented) to capture responsive speech from the user 105. The user device 110 may capture the audio 107 representing speech and may send (step 2) corresponding audio data 108 to the orchestrator component 130 for processing. In some embodiments, the audio data 108 may be associated with a dialog session identifier or a lesson identifier corresponding to an ongoing user-system dialog or the present lesson, respectively.

The orchestrator component 130 may send (step 3) the audio data 108 to the speech recognition component 135 for processing. The speech recognition component 135, in some embodiments, may include one or more automatic speech recognition (ASR) components 150 and one or more phoneme recognition components 140.

The speech recognition component 135 may also receive context data 109 from the orchestrator component 130. The context data 109 may include first data (e.g., a first language identifier, first text data, etc.) indicating a device language for the user device 110. The device language may be set by the user 105 and identifying data may be stored in device profile data and/or user profile data. The device language may be the user's native language and may be different than the learning language. The context data 109 may also include second data (e.g., a second language identifier, second text data, etc.) indicating a learning language that the language learning skill component 190a is providing lessons in for the user 105 to learn. The second language identifier may be provided by the language learning skill component 190a in conjunction with providing the output data for output to the user at step 1.

The speech recognition component 135 may select an ASR component 150a, from multiple ASR components 150, to execute based on the device language (i.e., the first language identifier) indicated in the context data 109, where the ASR component 150a may be configured to process speech inputs in the device language. The speech recognition component 135 may select a phoneme recognition component 140a, from multiple phoneme recognition components 140, to execute based on the learning language (i.e., the second language identifier) indicated in the context data 109, where the phoneme recognition component 140 may be configured to process speech inputs in the learning language.

This enables the user device 110 to support interactions in multiple languages. For example, the user 105 can provide commands in different languages (e.g., English, Spanish, etc.), and the speech recognition component 135 selects the ASR component 150, based on the device language identifier, that is capable of processing speech inputs of the corresponding language (e.g., an English processing ASR component 150a, a Spanish processing ASR component 150b, etc.). As a further example, the user 105 can learn different languages, and the speech recognition component 135 selects the phoneme recognition component 140, based on the learning language identifier provided by the language learning skill component 190a, that is capable of processing speech inputs of the corresponding learning language (e.g., an English phoneme recognition component 140a, a Spanish phoneme recognition component 140b, etc.). The user 105 can set the device language of the user device 110 and can also set the language for learning with the language learning skill component 190a.

The system 100 enables the user 105 to provide commands and language learning inputs during the same dialog session. Below is an example dialog session including user inputs and corresponding system responses for multiple dialog turns:

Turn 1, user: "I want to learn Spanish."
Turn 1, system: "Say 'Hola me llamo [name].'"
Turn 2, user: "Hola me llamo [name]."
Turn 2, system: "Great! Now try 'Vivo en [city].'"
Turn 3, user: "Stop lesson."
Turn 3, system: stops lesson by the language learning skill Thus, as illustrated by the above example, the user 105 can provide commands (e.g., turn 1 and turn 3) in a first language (in this case English) and provide learning inputs (e.g., turn 2) in a second learning language (in this case Spanish), and the system is able to respond appropriately using the techniques described herein.

In some embodiments, the context data 109 may include a skill identifier identifying a skill component 190 that is in-focus. A skill component 190 may be in-focus when it relates to the user input received by the system 100. A skill component 190 may be in-focus based on it being selected to respond to a user input preceding the current user input (e.g., a prior turn of a dialog session). A skill component 190 may be in-focus based on the user 105 invoking the skill prior to providing the user input (e.g., the user 105 selects an icon representing the skill, the user 105 says "Start [skill name]", etc.). A skill component 190 may be in-focus based on the system 100 determining that the skill relates to the user input. For example, the system 100 may process a user input "Play music" to determine that it relates to a music playing skill. The in-focus skill may change after the system 100 performs further processing (e.g., NLU processing).

In some embodiments, the speech recognition component 135 may only run a phoneme recognition component 140 for certain skills based on the skill identifier included in the context data 109. In some embodiments, certain skill components 190 may be included in an allowed list of skills that are authorized to receive phoneme data from the speech recognition component 135. Based on the skill identifier of the skill component 190 being included in the allowed list, the speech recognition component 135 may run the phoneme recognition component 140 to generate phoneme data for the skill component 190. For speech inputs that correspond to unauthorized skills, the speech recognition component 135 may only run the ASR component 150 and not run the phoneme recognition component 140.

The ASR component 150 may process the audio data 108 to generate a transcription of the spoken input from the user 105. The ASR component 150 may determine ASR data (e.g., token data, text data, ASR hypotheses including token or text data and corresponding confidence scores, etc.) representing the word(s) spoken by the user 105. Further details on the ASR component 150 are described below in relation to FIG. 4.

The phoneme recognition component 140 may process the audio data 108 to generate phonemes corresponding to the spoken input. The phoneme recognition component 140 may determine phoneme data that includes a N-best list of phoneme hypotheses, where a phoneme hypothesis includes a sequence of predicted phonemes and corresponding confidence scores. In some embodiments, the phoneme data may include phoneme stress information representing stress exhibited by the user 105 with respect to individual phonemes. The phoneme stress information may be represented as a numerical value. The phoneme recognition component 140 may implement a machine learning (ML) model to determine the phoneme data. Further details on the phoneme recognition component 140 are described below in relation to FIG. 3.

The speech recognition component 135 may determine speech recognition result data 136 based on the ASR data determined by the ASR component 150a and the phoneme data determined by the phoneme recognition component 140a. For example, the speech recognition component 135 may merge the ASR data and the phoneme data to determine the speech recognition result data 136. In some cases, the speech recognition result data 136 may include only the phoneme data. In some cases, the speech recognition result data 136 may include only the ASR data. Further details on how the speech recognition result data 136 is determined are described below in relation to FIGS. 2A and 2B.

By processing the audio data 108 using both the phoneme recognition component 140 and the ASR component 150, the system 100 can handle processing of user inputs that may be directed to learning of a language or that may be a command for the system 100, even when the system 100 expects a user response to a prompt from the language learning skill 190a. Examples of such commands may be "stop the lesson," "play music", "start a timer", "exit", etc.

The speech recognition component 135 may send (step 4) the speech recognition result data 136, corresponding to the spoken input of step 2, to the orchestrator component 130.

The orchestrator component 130 may send (step 5) the speech recognition result data 136 to the NLU component 160. The NLU component 160 may attempt to make a semantic interpretation of the word(s) or statement(s) represented in the spoken input by determining one or more meanings associated with the word(s) or statement(s) indicated in the speech recognition result data 136. The NLU component 160 may determine an intent representing an action that a user desires be performed and may determine information that allows a system component and/or device to execute the intent.

In some embodiments, where the speech recognition result data 136 includes the ASR data and the phoneme data, the NLU component 160 may process both to determine an intent corresponding to the spoken input.

The NLU component 160 may determine intents relating to the language learning skill component 190a. The NLU component 160 may determine intents relating to another skill component(s) 190b.

In example embodiments, the NLU component 160 may use an utterance matching technique to determine whether the ASR data matches a stored reference utterance, and may select an intent corresponding to the matching reference utterance. For example, if the ASR data indicates that the user 105 said "Repeat lesson," which has a matching reference utterance associated with a RepeatLessonIntent, then the NLU component 160 may determine that the spoken input corresponds to the RepeatLessonIntent. Example utterance matching techniques may include exact matching, semantic meaning matching, lexical matching, cosine distance similarity, etc. Example intents relating to the language learning skill component 190a that may be identified using the utterance matching technique, include RepeatLessonIntent, StopLessonIntent, NextLessonIntent, PreviousLessonIntent, ResumeLessonIntent, PauseLessonIntent, RepeatAnswerIntent, RepeatFeedbackIntent, etc. Example intents relating to the system or other skill components 190 include StartTimerIntent, StopSkillIntent, PauseSkillIntent, PlayMusicIntent, SendMessageIntent, etc.

The NLU component 160 may determine that the spoken input corresponds to a PronunciationEvaluationIntent relating to the language learning skill component 190a. This determination may be made based on the ASR data indicating that the spoken input is not a phrase/command. In some cases, the ASR data may indicate an error, silence (e.g., null data or silence indicator), or otherwise unrecognizable speech (e.g., low ASR confidence scores) with respect to the spoken input. This may occur when the spoken input is in response to a prompt from the language learning skill component 190a and includes speech in the learning language, since the ASR component 150a is configured for the device language and not the learning language. In other cases, the PronunciationEvaluationIntent may be determined based on the ASR data indicating a phrase that does not match a reference utterance (i.e., the PronunciationEvaluationIntent may be a fallback intent).

In yet other cases, the PronunciationEvaluationIntent may be determined based on the phoneme data satisfying a condition. For example, the PronunciationEvaluationIntent may be determined when the phoneme data indicates a confidence score(s) satisfying a threshold value which may indicate that the spoken input is in the learning language and may be in response to a prompt from the language learning skill component 190a.

In some embodiments, the language learning skill component 190a may provide a response to the prompt (i.e., the words expected from the user 105) to the NLU component 160. In such cases, the NLU component 160 may determine the PronunciationEvaluationIntent based on the ASR data and/or the phoneme data indicating that the spoken input corresponds to the expected response (e.g., based on lexical similarity, semantic similarity, exact matching, cosine distance similarity, etc.).

The NLU component 160 may determine NLU data 162 including one or more NLU hypotheses, where individual NLU hypotheses may include a corresponding domain indicator, intent indicator, entity data (e.g., entity types, entity values), skill indicator, and/or NLU confidence score. The NLU component 160 may send (step 6) the NLU data 162 to the orchestrator component 130.

The orchestrator component 130 may send (step 7) the NLU data 162 to the language learning skill component 190a when the NLU data 162 includes an intent capable of being processed by the language learning skill 190a (e.g., when the NLU data includes PronunciationEvaluationIntent) and/or when the NLU data 162 includes a skill identifier of the language learning skill component 190a. The orchestrator component 130 may also send (step 7) the speech recognition result data 136 to the language learning skill component 190a. In some embodiments, the orchestrator component 130 may send the phoneme data, without sending the ASR data, to the language learning skill component 190a. In such embodiments, the orchestrator component 130 may parse the phoneme data from the speech recognition result data 136 and send the phoneme data to the language learning skill component 190a. The orchestrator component 130 may send the phoneme data based on determining that the language learning skill component 190a is authorized to receive phoneme data. In cases where data is sent to the skill support system(s) 125, the system component(s) 120 may determine whether the skill support system(s) 125 is authorized to receive speech recognition result data 136 and/or phoneme data, and based on being authorized, may send the speech recognition result data 136 or the phoneme data to the skill support system(s) 125.

In some embodiments, the orchestrator component 130 may send the NLU data to a different skill component 190b based on the skill indicator and/or intent indicator included in the NLU data 162. Based on the skill component 190b being on the allowed list to receive phoneme data, the orchestrator component 130 may also send the speech recognition result data 136 or just the phoneme data to the skill component 190b.

When the NLU data 162 indicates the PronunciationEvaluationIntent, the language learning skill component 190a may determine, using the speech recognition result data 136, output data that may be pronunciation feedback in response to the user speaking the prompted word(s) in the learning language. In some embodiments, the language learning skill component 190a may include a feedback component 192 that may be configured to determine pronunciation feedback data with respect to the spoken input (received in step 2). The feedback component 192 may process the phoneme data, determined by the phoneme recognition component 140a, with respect to reference phoneme data for the word(s) that the user 105 is prompted to speak. The reference phoneme data may be determined from a lesson data storage 191 based on a language learning lesson that the user 105 may be participating in.

The lesson data storage 191 may store lesson related data such as prompts, response to prompts, lesson identifiers (e.g., name, number, etc.), lesson concepts, etc. The lesson data storage 191 may indicate a sequence in which lessons are presented.

The feedback component 192 may determine feedback data based on a condition(s). In example embodiments, the feedback component 192 may compare the determined phoneme data for the spoken input and the reference phoneme data to determine a difference (or similarity) between them. In some embodiments, the feedback component 192 may use one or more techniques (e.g., algorithms, machine learning models, statistical models, etc.) to determine a similarity between the determined phoneme data and the stored phoneme data. The feedback component 192 may determine a score representing the similarity between individual phonemes. An alignment between the reference phoneme data and the determined phoneme data may be performed based on the sequence of phonemes (e.g., first stored phoneme aligned with first determined phoneme), audio time stamp (e.g., first x milliseconds of determined phonemes aligned with first y stored phonemes), and/or other factors. The similarity score may be low (or high depending on system configuration) for determined phonemes that do not match the reference phonemes, and the similarity score may be high (or low) for determined phonemes that match the reference phonemes.

In some embodiments, the feedback component 192 may use a machine learning model, a statistical model, an algorithm and/or other techniques to score the phoneme data for the spoken input with respect to reference phoneme data for the prompted word(s).

The language learning skill component 190a may determine the output data based on the scores for the individual phonemes. If the scores indicate that the determined phonemes are similar or match the stored phonemes, the language learning skill component 190a may determine that the user 105 pronounced the word(s) correctly and may determine output data indicative of such. If the scores indicate that one or more of the determined phonemes are not similar or do not match the reference phonemes, the language learning skill component 190a may determine that the user 105 mispronounced the word(s). In such cases, the learning skill component 190a may determine output data indicating which phoneme(s) the user 105 mispronounced.

The condition(s), based on which the feedback data is determined, may be updated based on various factors. In some embodiments, the condition(s) may be a threshold score. In an example embodiment, the threshold score may be modified (e.g., increased or decreased) based on the user 105 selecting a difficulty level for the language learning lesson. In another embodiment, the system may modify the threshold score based on the user's progress in learning the language and/or the number of user attempts in learning the prompted word(s). In one example, the threshold score may be increased (or decreased depending on system configuration) after the user has completed a certain number of iterations (e.g., one or two iterations) of a particular lesson. In another example, the threshold score may be decreased (or increased depending on system configuration) after the user mispronounces a word(s) at least a threshold number of times.

In some embodiments, the language learning skill component 190a may accept different correct pronunciations for the prompted word(s). In an example, for the English word "data" both pronunciations of "day-tuh" and "da-tuh" may be accepted as correct. In such cases, the feedback component 192 may compare the phoneme data determined by the phoneme recognition component 140a with more than one reference phoneme data corresponding to more than one correct pronunciation of the prompted word(s).

In some embodiments, if the user 105 mispronounces the prompted word(s), the language learning skill component 190a may also determine corrective data informing the user 105 on how to correctly pronounce the word(s). Such corrective data may be at a phoneme-level and may indicate which phonemes to stress and whether a phoneme is a long sound, short sound, hard sound, soft sound, etc. The stored reference phoneme data may include numerical values representing stress corresponding to individual phonemes, which may be comparted to the stress information included in the phoneme data determined by the phoneme recognition component 140a to determine whether a phoneme is mispronounced and/or the corrective data.

When the NLU data 162 includes an intent other than the PronunciationEvaluationIntent, the language learning skill component 190a may perform an action corresponding to the intent. For example, if the NLU data 162 includes the NextLessonIntent, then the language learning skill component 190a may determine output data (e.g., lesson name, additional prompt(s), etc.) corresponding to a next lesson that may be determined from the lesson data storage 191. As another example, if the NLU data 162 includes the RepeatResponseIntent, then the language learning skill component 190a may determine output data representing the prior skill response (e.g., repeating prior pronunciation feedback, repeating prior correct pronunciation, etc.) to the user speaking the previously prompted word(s).

The language learning skill component 190a may send (step 8) the output data to the orchestrator component 130. The orchestrator component 130 may send (step 9) data to the user device 110 causing it to perform an action in accordance with the output data from the language learning skill component 190a. The output data may include audio data representing synthesized speech. In some embodiments, the output data may be text data, SSML tagged data or other word representation data, which may be processed by a TTS component 480 to generate audio data representing synthesized speech. Additionally or alternatively the output data may include data (e.g., text data, graphics, images, etc.) for display at the user device 110.

In one example, the output data may inform the user 105 that the prompted word(s) is correctly pronounced. In another example, the output data may inform the user 105 of the correct pronunciation of the word(s). In a further example, the output data may inform the user 105 of the phoneme(s) that is/are mispronounced. In yet a further example, the output data may inform the user 105 of the correct phoneme stress. The language learning skill component 190a can provide fine-grained feedback on a phoneme-level based on scoring phonemes in an individual manner.

The language learning skill component 190a may determine feedback data based on whether each phoneme score individually satisfies a condition. In some embodiments, the feedback component 192 may use a threshold score/value to determine whether a word and/or phoneme is mispronounced. For example, if the similarity score is below (or above depending on system configuration) the threshold score, then the word or phoneme may be determined to be mispronounced. As a further example, if the similarity score is above (or below depending on system configuration) the threshold score, then the word or phoneme may be determined to be correctly pronounced. In some embodiments, the feedback component 192 may determine that a word is mispronounced based on at least one phoneme of the word being mispronounced. In other embodiments, the feedback component 192 may determine that a word is mispronounced based on an average (or median, mean, sum, etc.) of the scores of the individual phonemes of the word, and the average satisfying a condition or being below a threshold score.

In the case, where the spoken input is a command (as opposed to the spoken input being an attempt of the user 105 to speak the prompted word(s)), the language learning skill component 190a may determine output data responsive to the command. In such a case, the output data may cause the system component(s) 120 and/or the user device 110 to perform an action(s). For example, if the command is "stop lesson," the language learning skill component 190a may end the language learning lesson and may store data relating to the lesson (e.g., data indicating where in the lesson the user stopped, data indicating when the lesson was stopped, words that were pronounced/learned during the lesson, etc.). As a further example, if the command is "stop lesson," the user device 110 may present an output indicating the lesson has ended (e.g., display text, output synthesized speech, display graphics, etc.). The language learning skill component 190a may send (step 8) the output data to the orchestrator component 130. The orchestrator component 130 may send (step 9) data to the user device 110 to cause it to perform an action based on the output data determined by the language learning skill component 190a.

The system component(s) 120 may also be in communication with a data storage 195. The data storage 195 may receive and store particular types of data relating to language learning interactions. The system component(s) 120 may send the audio data 108 representing a spoken input, a first language indicator representing the language of the spoken input (e.g., the device language or the learning language), data representing the words that are supposed to be included in the spoken input (e.g., the word(s) expected in response to the prompt from the language learning skill component 190a), and a second language indicator representing the device language that the user device 110 is set to. The data provided to the data storage 195 may be anonymized such that user identifying data may be removed or otherwise obfuscated. For example, the data storage 195 may store audio data representing speech "Hola me llamo es name", a Spanish language indicator for the spoken input, text data representing "Hola me llamo es [name]", and an English language indicator for the device language. The data storage 195 may be used for training system component(s) 120, for example, the ASR components 150, to generate metrics, etc.

In some embodiments, the system 100 may use a dialog session to track user inputs, from the user 105, and system outputs. In example embodiments, the orchestrator component 130 may associate a dialog session identifier with the audio data 108 and corresponding data determined based on processing the audio data 108. For example, the system 100 may associate a dialog session identifier with (i) a first system output prompting the user 105 to say a word(s) in the learning language; (ii) audio data representing the user 105 saying the prompted word(s); and (iii) a second system output providing pronunciation feedback to the user 105. The dialog session identifier may be associated with further user inputs and system outputs of the same dialog session.

As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response.

In some embodiments, the context data 109 may be provided to the speech recognition component 135 for each dialog turn, i.e., for each spoken input from the user 105. In other embodiments, the context data 109 may be provided to the speech recognition component 135 at the start of the dialog session with the first turn spoken input, since the device language and the learning language information may remain the same for the dialog session.

FIG. 2A is a conceptual diagram of an example speech recognition component 135, according to embodiments of the present disclosure. In addition to the ASR component 150 and the phoneme recognition component 140, in some embodiments, the speech recognition component 135 may also include a merging component 210. The merging component 210 may be configured to combine ASR data 215, determined by the ASR component 150a based on processing the audio data 108, and phoneme data 220, determined by the phoneme recognition component 140a based on processing the audio data 108. The merging component 210 may generate the speech recognition result data 136 based on combining the ASR data 215 and the phoneme data 220.

FIG. 2B is a flowchart illustrating an example process that may be performed by the merging component 210 to determine the speech recognition result data 136. The ASR component 150a and the phoneme component 140a may output null data when the audio data 108 does not include recognizable speech; for example, the audio data 108 may be background noise, media sounds or sounds other than human speech, the audio data 108 may be too noisy to recognize speech, the audio data 108 may include speech in a language that the component is not configured for, etc. At a decision step 252, the merging component 210 may determine whether both of the ASR data 215 and the phoneme data 220 are null.

If both the ASR data 215 and the phoneme data 220 are null, then at a step 254, the merging component 210 may output a "silence" indicator in the speech recognition result data 136. In other embodiments, in such cases, the merging component 210 may output null data, an error indicator, etc. as the speech recognition result data 136.

If both of the ASR data 215 and the phoneme data 220 are not null, then at decision step 256, the merging component 210 may determine whether the ASR data 215 is null. If the ASR data 215 is not null, then at a step 258, the merging component 210 may output the ASR data 215 and the phoneme data 220 as the speech recognition result data 136.

If the ASR data 215 is null, then at a step 260, the merging component 210 may insert the phoneme data 220 in the ASR data slot of the speech recognition result data 136. This may be done so that downstream processing may continue with respect to the phoneme data 220 even when the ASR data 215 is null. In some embodiments, some of the system component(s) 120 may be configured to not process with respect to a spoken input when the ASR data 215 is null. For example, if the ASR component 150a is unable to transcribe speech from the input audio data, then the system 100 may output an error (e.g., the system may respond "Sorry I don't understand", "Can you please repeat that?", etc.) indicating that it could not understand what the user said in the device language (when in fact the user 105 is attempting to pronounce words in the learning language). In some language learning cases, the ASR data 215 may be null as the ASR component 150a may be configured to transcribe speech in the user's native language, however, the input speech is in the learning language. In such cases, the phoneme data 220 is needed by the skill component 190a to determine pronunciation feedback, so the phoneme data 220 is included in the speech recognition result data 136 in the ASR data slot, to enable the downstream components to continue processing.

In other embodiments, if the ASR data 215 is null, then the speech recognition result data 136 may include a silence indicator in the ASR data slot, and the downstream components may be configured to continue processing with respect to the spoken input when the phoneme data 220 is not null.

In yet other embodiments, the ASR data 215 may include an error indicator representing that the input speech is in a language that the ASR component 150a is not capable of processing.

In embodiments, the phoneme recognition component 140 described herein includes a RNN-T model, along with some approaches to relax the innate autoregressiveness of an RNN-T model, so that it can achieve a good balance of false rejection and false acceptance rates of mispronunciation detection. In embodiments, a weakly supervised data augmentation approach with an extended phoneme set is also used for the disambiguation of different language phonemes.

FIG. 3 is a conceptual diagram of example components of the phoneme recognition component 140. In example embodiments, the phoneme recognition component 140 includes an encoder 310, a joint network 320 and a prediction network 350. The joint network 320 may be followed by a softmax layer 330.

The phoneme recognition component 140 may be configured to recognize phonemes from audio data. In some embodiments, the phoneme recognition component 140 may implement a machine learning (ML) model shown in FIG. 3.

The ML model may use a first language lexicon and a second language lexicon to recognize phonemes. In example embodiments, the first language lexicon may correspond to the learning language and the second language lexicon may correspond to a native language of the user 105 (e.g., the device language). For example, if the user 105 is a native English speaker wanting to learn Spanish, then the first language lexicon may include Spanish words and the second language lexicon may include English words. In some embodiments, the lexicons may include label data identifying phonemes of the respective words. In some embodiments, the ML model may use lexicons for additional languages.

The phoneme recognition component 140 processes a sequence of inputs (e.g., audio frames) in order, so that the output corresponding to each input factors in both the inputs and outputs that preceded it. The encoder 310 receives acoustic feature data 305. The acoustic feature data 305 may be a raw acoustic feature vector corresponding to an audio frame from the audio data 108. For example, the encoder 310 may receive acoustic feature vectors $x=x_1, x_2, \ldots x_T$ for an audio frame of length T. The encoder 310 converts the acoustic feature data 305 to a sequence of hidden states $h^E t = f^E(x_t)$, where t is the time/frame index.

The prediction network 350 may operate as a language model that takes previous non-blank subword label prediction $y_{u-1}$ as input, and produces hidden representation $h^D u = f^D(y_{u-1})$, where u is the label index. Note that this formulation is different from other models, like Connectionist Temporal Classification (CTC), where conditional independence is assumed (i.e., $y_u \perp y_j$ where j<u). The phoneme recognition component 140 may remove this independence assumption by instead conditioning on the full history of previous non-blank labels.

The joint network 320 may be a feed-forward network that takes each combination of encoder output and prediction network output and computes output logits $z_{u,t}^J = f^J(h^E t, h^D u)$. Then the softmax layer 330 may be applied on top of the logits to produce a final posterior for the next output token. The phoneme recognition component 140 may be trained by minimizing the RNN-T loss:

$$L_{RNN-T} = -\log P(y|x)$$

The phoneme recognition component 140 may be configured to capture different degrees of conditional dependence. In one example embodiment, the phoneme recognition component 140 may be configured to determine monophones (e.g., predicted monophone 332, monophone 352). In such embodiments, the training data for the RNN-T model is formatted as a pair of audio and its corresponding monophone sequence. In another example embodiment, the phoneme recognition component 140 may be configured to determine syllables (e.g., predicted syllable 334, syllable 354). In such embodiments, the training data is a pair of audio and its corresponding syllable sequence. Techniques to convert the phonemes into a syllable may be applied, for example, a Maximum Onset Principle.

In some embodiments, the phoneme recognition component 140 may also determine a stress level for the predicted monophone 332 or predicted syllable 334. The stress level may be represented as a numerical value (e.g., 0—for no stress; 1—for medium stress; 2—for high stress; etc.), or another value (e.g., alphanumerical value, Boolean value, etc.).

The phoneme recognition component 140 may determine a probability distribution over a number of predicted monophones 332 or predicted syllables 334, using which, the phoneme recognition component 140 may determine more than one phoneme hypothesis to include in the phoneme data 220.

In some embodiments, the monophone RNN-T and syllable RNN-T models may each consist of a six-layer LSTM encoder with 1,024 units each and a two-layer LSTM prediction network with the same number of units. In some embodiments, an Adam optimizer with a warm-up, hold, and exponential learning rate decay policy and a mini-batch size of 768 may be used. In some embodiments, 64-dimensional Log-Mel-Frequency features with a filter bank size of 64 may be extracted every 10 ms from the input speech signal. In some embodiments, three consecutive audio frames may be stacked, resulting in a 192-dimensional feature vector. 4,000 wordpieces for input embedding may be used.

The phoneme recognition component 140 may be configured using an approach that allows the model to both (i) leverage the conditional dependence (i.e., phoneme history) to capture the mispronunciation patterns of language learners; and (ii) avoid over-smoothing of the prediction output, which leads the model to be insensitive to mispronunciation. The training data for the phoneme recognition component 140 may include diverse samples comprising correct pronunciations and mispronunciations for various words of the learning language. For example, the phoneme recognition component 140 can recognize when "morning" is mispronounced as "morting".

The phoneme recognition component 140 may perform cross-lingual phoneme disambiguation. Consider a use case for Spanish speakers learning English. To distinguish Spanish phonemes when speaking English from canonical reference pronunciation, the phoneme recognition component 140 can be trained using audio clips collected from Spanish speakers speaking English and the audio clips can be annotated with a phoneme set.

Some embodiments involve using a novel weakly supervised data augmentation technique that uses a small amount, if any, of learning language speech or annotated learning language speech. This technique allows the phoneme recognition component 140 to learn and disambiguate native language and non-native language phonemes using a large speech corpus. In an example embodiment, a multi-lingual lexicon is created by merging lexicons of multiple languages that include words annotated with their respective phonemes. During this process, the phonemes that are (almost) indistinguishable are merged, while unique phonemes are kept as separate. For example, phonemes such as "ll" in Spanish and "y" in English may be merged, while phonemes such as the hard "r" sound in Spanish is kept separate from the English "r" phoneme. The multi-lingual lexicon may then be used to configure the phoneme recognition component 140.

Figure 4:
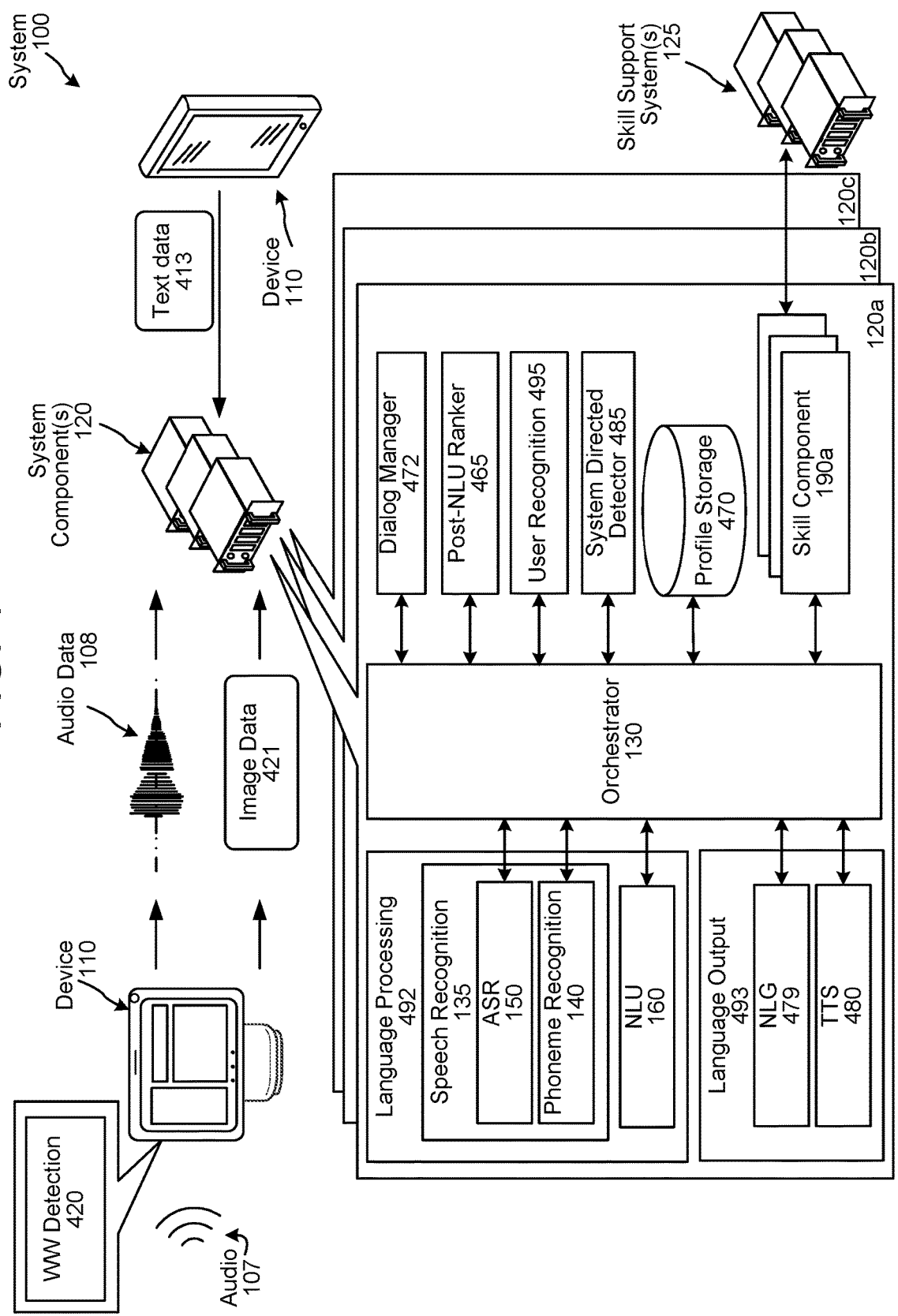
FIG. 4 is a conceptual diagram of components of the system, according to embodiments of the present disclosure.

The system 100 may operate using various components as described in FIG. 4. The various components may be located on same or different physical devices. Communication between various components may occur directly or across a network(s) 199. The device 110 may include audio capture component(s), such as a microphone or array of microphones of a device 110, captures audio 107 and creates corresponding audio data. Once speech is detected in audio data representing the audio 107, the device 110 may determine if the speech is directed at the device 110/system component(s) 120. In at least some embodiments, such determination may be made using a wakeword detection component 420. The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of device 110. Other input forms may include indication that the user has pressed a physical or virtual button on device 110, the user has made a gesture, etc. The device 110 may also capture images using camera(s) 618 of the device 110 and may send image data 421 representing those image(s) to the system component(s) 120. The image data 421 may include raw image data or image data processed by the device 110 before sending to the system component(s) 120. The image data 421 may be used in various manners by different components of the system to perform operations such as determining whether a user is directing an utterance to the system, interpreting a user command, responding to a user command, etc.

The wakeword detection component 420 of the device 110 may process the audio data, representing the audio 107, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

Once the wakeword is detected by the wakeword detection component 420 and/or input is detected by an input detector, the device 110 may "wake" and begin transmitting audio data 108, representing the audio 107, to the system component(s) 120. The audio data 108 may include data corresponding to the wakeword; in other embodiments, the portion of the audio corresponding to the wakeword is removed by the device 110 prior to sending the audio data 108 to the system component(s) 120. In the case of touch input detection or gesture based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 420 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 190 of one or more system components 120.

The system component(s) 120 may include a system directed input detector 485. The system directed input detector 485 may be configured to determine whether an input to the system (for example speech, a gesture, etc.) is directed to the system or not directed to the system (for example directed to another user, etc.). The device 110 may include a system directed input detector 585 that may operate similar to the system directed input detector 485. The system directed input detector 485 may work in conjunction with the wakeword detection component 420. If the system directed input detector 485 determines an input is directed to the system, the device 110 may "wake" and begin sending captured data for further processing (for example, processing audio data using the language processing 492/592, processing captured image data 421, or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 485 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 485 is determining whether an input is potentially device directed. For example, the system may output an orange indicator while considering an input, and may output a green indicator if a system directed input is detected. Other such configurations are possible.

Upon receipt by the system component(s) 120, the audio data 108 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 108 to a language processing component 492. The language processing component 492 (sometimes also referred to as a spoken language understanding (SLU) component) includes the speech recognition component 135 (including the ASR components 150 and the phoneme recognition component 140 shown in FIG. 1) and the NLU component 160. The ASR component 150 may transcribe the audio data 108 into text data. The text data output by the ASR component 150 represents one or more than one (e.g., in the form of an N-best list) ASR hypotheses representing speech represented in the audio data 108. The ASR component 150 interprets the speech in the audio data 108 based on a similarity between the audio data 108 and pre-established language models. For example, the ASR component 150 may compare the audio data 108 with models for sounds (e.g., acoustic units such as phonemes, senons, phones, etc.) and sequences of sounds to identify words that match the sequence of sounds of the speech represented in the audio data 108. In some embodiments, the ASR component 150 may use one or more machine learning models, for example, neural network models, RNN models, RNN-T models, etc. The ASR component 150 sends the text data generated thereby to an NLU component 160, via, in some embodiments, the orchestrator component 130. The text data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein.

The language processing component 492 may further include a NLU component 160. The NLU component 160 may receive the text data from the ASR component. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the device 110, the system component(s) 120, a skill component 190, a skill support system(s) 125, etc.) to execute the intent. For example, if the text data corresponds to "play the 5th Symphony by Beethoven," the NLU component 160 may determine an intent that the system output music and may identify "Beethoven" as an artist/composer and "5th Symphony" as the piece of music to be played. For further example, if the text data corresponds to "what is the weather," the NLU component 160 may determine an intent that the system output weather information associated with a geographic location of the device 110. In another example, if the text data corresponds to "turn off the lights," the NLU component 160 may determine an intent that the system turn off lights associated with the device 110 or the user 105. However, if the NLU component 160 is unable to resolve the entity—for example, because the entity is referred to by anaphora such as "this song" or "my next appointment"— the speech processing system 492 can send a decode request to another speech processing system 492 for information regarding the entity mention and/or other context related to the utterance. The speech processing system 492 may augment, correct, or base results data upon the audio data 108 as well as any data received from the other speech processing system 492.

The NLU component 160 may return NLU results data (which may include tagged text data, indicators of intent, etc.) back to the orchestrator component 130. The orchestrator component 130 may forward the NLU results data to a skill component(s) 190. If the NLU results data includes a single NLU hypothesis, the NLU component 160 and the orchestrator component 130 may direct the NLU results data to the skill component(s) 190 associated with the NLU hypothesis. If the NLU results data includes an N-best list of NLU hypotheses, the NLU component 160 and the orchestrator component 130 may direct the top scoring NLU hypothesis to a skill component(s) 190 associated with the top scoring NLU hypothesis. The system may also include a post-NLU ranker 465 which may incorporate other information to rank potential interpretations determined by the NLU component 160. The local device 110 may also include its own post-NLU ranker 565, which may operate similarly to the post-NLU ranker 465.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system component(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system(s) 125. Unless expressly stated otherwise, reference to a skill, skill device, or skill component may include a skill component 190 operated by the system component(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator component 130.

The post-NLU ranker 465 may include a statistical component that produces a ranked list of intent/skill pairs with associated confidence scores. Each confidence score may indicate an adequacy of the skill's execution of the intent with respect to NLU results data associated with the skill. The post-NLU ranker 465 may operate one or more trained models configured to process the NLU results data, skill result data, and the other data in order to output ranked output data. The ranked output data may include an n-best list where the NLU hypotheses in the NLU results data are reordered such that the n-best list in the ranked output data represents a prioritized list of skills to respond to a user input as determined by the post-NLU ranker 465. The ranked output data may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 465 enables the system to better determine the best skill to execute the user input. For example, first and second NLU hypotheses in the NLU results data may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 465 (or other scheduling component such as orchestrator component 130) may solicit the first skill and the second skill to provide potential result data based on the first NLU hypothesis and the second NLU hypothesis, respectively. For example, the post-NLU ranker 465 may send the first NLU hypothesis to the first skill 190a along with a request for the first skill 190a to at least partially execute with respect to the first NLU hypothesis. The post-NLU ranker 465 may also send the second NLU hypothesis to the second skill 190b along with a request for the second skill 190b to at least partially execute with respect to the second NLU hypothesis. The post-NLU ranker 465 receives, from the first skill 190a, first result data generated from the first skill 190a's execution with respect to the first NLU hypothesis. The post-NLU ranker 465 also receives, from the second skill 190b, second results data generated from the second skill 190b's execution with respect to the second NLU hypothesis.

The post-NLU ranker 465 may consider the first skill result data and the second skill result data to alter the first confidence score and the second confidence score of the first NLU hypothesis and the second NLU hypothesis, respectively. That is, the post-NLU ranker 465 may generate a third confidence score based on the first result data and the first confidence score. The third confidence score may correspond to how likely the post-NLU ranker 465 determines the first skill will correctly respond to the user input. The post-NLU ranker 465 may also generate a fourth confidence score based on the second result data and the second confidence score. One skilled in the art will appreciate that a first difference between the third confidence score and the fourth confidence score may be greater than a second difference between the first confidence score and the second confidence score. The post-NLU ranker 465 may also consider the other data to generate the third confidence score and the fourth confidence score. While it has been described that the post-NLU ranker 465 may alter the confidence scores associated with first and second NLU hypotheses, one skilled in the art will appreciate that the post-NLU ranker 465 may alter the confidence scores of more than two NLU hypotheses. The post-NLU ranker 465 may select the result data associated with the skill 190 with the highest altered confidence score to be the data output in response to the current user input. The post-NLU ranker 465 may also consider the ASR output data to alter the NLU hypotheses confidence scores.

The orchestrator component 130 may, prior to sending the NLU results data to the post-NLU ranker 465, associate intents in the NLU hypotheses with skills 190. For example, if a NLU hypothesis includes a <PlayMusic> intent, the orchestrator component 130 may associate the NLU hypothesis with one or more skills 190 that can execute the <PlayMusic> intent. Thus, the orchestrator component 130 may send the NLU results data, including NLU hypotheses paired with skills 190, to the post-NLU ranker 465. In response to ASR output data corresponding to "what should I do for dinner today," the orchestrator component 130 may generates pairs of skills 190 with associated NLU hypotheses corresponding to:

Skill 1/NLU hypothesis including <Help> intent
    Skill 2/NLU hypothesis including <Order> intent
    Skill 3/NLU hypothesis including <DishType> intent The post-NLU ranker 465 queries each skill 190, paired with a NLU hypothesis in the NLU output data, to provide skill result data based on the NLU hypothesis with which it is associated. That is, with respect to each skill, the post-NLU ranker 465 colloquially asks the each skill "if given this NLU hypothesis, what would you do with it." According to the above example, the post-NLU ranker 465 may send skills 190 the following data:

Skill 1: First NLU hypothesis including <Help> intent indicator
    Skill 2: Second NLU hypothesis including <Order> intent indicator
    Skill 3: Third NLU hypothesis including <DishType> intent indicator The post-NLU ranker 465 may query each of the skills 190 in parallel or substantially in parallel.

A skill 190 may provide the post-NLU ranker 465 with various data and indications in response to the post-NLU ranker 465 soliciting the skill 190 for result data. A skill 190 may simply provide the post-NLU ranker 465 with an indication of whether or not the skill can execute with respect to the NLU hypothesis it received. A skill 190 may also or alternatively provide the post-NLU ranker 465 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 465 with result data indicating slots of a framework that the skill 190 further needs filled or entities that the skill 190 further needs resolved prior to the skill 190 being able to provided result data responsive to the user input. The skill 190 may also provide the post-NLU ranker 465 with an instruction and/or computer-generated speech indicating how the skill 190 recommends the system solicit further information needed by the skill 190. The skill 190 may further provide the post-NLU ranker 465 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 465 with the following:

Skill 1: indication representing the skill can execute with respect to a NLU hypothesis including the <Help> intent indicator
    Skill 2: indication representing the skill needs to the system to obtain further information
    Skill 3: indication representing the skill can provide numerous results in response to the third NLU hypothesis including the <DishType> intent indicator The post-NLU ranker 465 uses the result data provided by the skills 190 to alter the NLU confidence scores. That is, the post-NLU ranker 465 uses the result data provided by the queried skills 190 to create larger differences between the NLU confidence scores generated by the NLU component 160. Without the post-NLU ranker 465, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 465, the system may not be able to determine whether to obtain output data from a general reference information skill or a medical information skill in response to a user input corresponding to "what is acne."

The post-NLU ranker 465 may prefer skills 190 that provide result data responsive to NLU hypotheses over skills 190 that provide result data corresponding to an indication that further information is needed, as well as skills 190 that provide result data indicating they can provide multiple responses to received NLU hypotheses. For example, the post-NLU ranker 465 may generate a first score for a first skill 190a that is greater than the first skill's NLU confidence score based on the first skill 190a providing result data including a response to a NLU hypothesis. For further example, the post-NLU ranker 465 may generate a second score for a second skill 190b that is less than the second skill's NLU confidence score based on the second skill 190b providing result data indicating further information is needed for the second skill 190b to provide a response to a NLU hypothesis. Yet further, for example, the post-NLU ranker 465 may generate a third score for a third skill 190c that is less than the third skill's NLU confidence score based on the third skill 190c providing result data indicating the third skill 190c can provide multiple responses to a NLU hypothesis.

The post-NLU ranker 465 may consider other data in determining scores. The other data may include rankings associated with the queried skills 190. A ranking may be a system ranking or a user-specific ranking. A ranking may indicate a veracity of a skill from the perspective of one or more users of the system. For example, the post-NLU ranker 465 may generate a first score for a first skill 190a that is greater than the first skill's NLU processing confidence score based on the first skill 190a being associated with a high ranking. For further example, the post-NLU ranker 465 may generate a second score for a second skill 190b that is less than the second skill's NLU processing confidence score based on the second skill 190b being associated with a low ranking.

The other data may include information indicating whether or not the user that originated the user input has enabled one or more of the queried skills 190. For example, the post-NLU ranker 465 may generate a first score for a first skill 190a that is greater than the first skill's NLU processing confidence score based on the first skill 190a being enabled by the user that originated the user input. For further example, the post-NLU ranker 465 may generate a second score for a second skill 190b that is less than the second skill's NLU processing confidence score based on the second skill 190b not being enabled by the user that originated the user input. When the post-NLU ranker 465 receives the NLU results data, the post-NLU ranker 465 may determine whether profile data, associated with the user and/or device that originated the user input, includes indications of enabled skills.

The other data may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 465 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 465 may increase the NLU processing confidence score associated with a first skill configured to output visual data and/or decrease the NLU processing confidence score associated with a second skill configured to output audio data.

The other data may include information indicating the type of device that originated the user input. For example, the device may correspond to a "hotel room" type if the device is located in a hotel room. If a user inputs a command corresponding to "order me food" to the device located in the hotel room, the post-NLU ranker 465 may increase the NLU processing confidence score associated with a first skill 190a corresponding to a room service skill associated with the hotel and/or decrease the NLU processing confidence score associated with a second skill 190b corresponding to a food skill not associated with the hotel.

The other data may include information indicating a location of the device and/or user that originated the user input. The system may be configured with skills 190 that may only operate with respect to certain geographic locations. For example, a user may provide a user input corresponding to "when is the next train to Portland." A first skill 190a may operate with respect to trains that arrive at, depart from, and pass through Portland, Oregon. A second skill 190b may operate with respect to trains that arrive at, depart from, and pass through Portland, Maine. If the device and/or user that originated the user input is located in Seattle, Washington, the post-NLU ranker 465 may increase the NLU processing confidence score associated with the first skill 190a and/or decrease the NLU processing confidence score associated with the second skill 190b. Likewise, if the device and/or user that originated the user input is located in Boston, Massachusetts, the post-NLU ranker 465 may increase the NLU processing confidence score associated with the second skill 190b and/or decrease the NLU processing confidence score associated with the first skill 190a.

The other data may include information indicating a time of day. The system may be configured with skills 190 that operate with respect to certain times of day. For example, a user may provide a user input corresponding to "order me food." A first skill 190a may generate first result data corresponding to breakfast. A second skill 190b may generate second result data corresponding to dinner. If the system(s) 120 receives the user input in the morning, the post-NLU ranker 465 may increase the NLU processing confidence score associated with the first skill 190a and/or decrease the NLU processing score associated with the second skill 190b. If the system(s) 120 receives the user input in the afternoon or evening, the post-NLU ranker 465 may increase the NLU processing confidence score associated with the second skill 190b and/or decrease the NLU processing confidence score associated with the first skill 190a.

The other data may include information indicating user preferences. The system may include multiple skills 190 configured to execute in substantially the same manner. For example, a first skill 190a and a second skill 190b may both be configured to order food from respective restaurants. The system may store a user preference (e.g., in the profile storage 470) that is associated with the user that provided the user input to the system components(s) 120 as well as indicates the user prefers the first skill 190a over the second skill 190*b*. Thus, when the user provides a user input that may be executed by both the first skill 190*a* and the second skill 190*b*, the post-NLU ranker 465 may increase the NLU processing confidence score associated with the first skill 190*a* and/or decrease the NLU processing confidence score associated with the second skill 190*b*.

The other data may include information indicating system usage history associated with the user that originated the user input. For example, the system usage history may indicate the user originates user inputs that invoke a first skill 190*a* more often than the user originates user inputs that invoke a second skill 190*b*. Based on this, if the present user input may be executed by both the first skill 190*a* and the second skill 190*b*, the post-NLU ranker 465 may increase the NLU processing confidence score associated with the first skill 190*a* and/or decrease the NLU processing confidence score associated with the second skill 190*b*.

It has been described that the post-NLU ranker 465 uses the other data to increase and decrease NLU confidence scores associated with various skills 190 that the post-NLU ranker 465 has already requested result data from. Alternatively, the post-NLU ranker 465 may use the other data to determine which skills 190 to request result data from. For example, the post-NLU ranker 465 may use the other data to increase and/or decrease NLU processing confidence scores associated with skills 190 associated with the NLU results data output by the NLU component 160. The post-NLU ranker 465 may select n-number of top scoring altered NLU processing confidence scores. The post-NLU ranker 465 may then request result data from only the skills 190 associated with the selected n-number of NLU processing confidence scores.

As described, the post-NLU ranker 465 queries multiple skills associated with the NLU results data to provide result data to the post-NLU ranker 465 prior to the post-NLU ranker 465 ultimately determining the skill 190 to be invoked to respond to the user input. Some of the skills 190 may provide result data indicating responses to NLU hypotheses while other skills 190 may providing result data indicating the skills cannot provide responsive data. Whereas a system not implementing the post-NLU ranker 465 may select one of the skills 190 that could not provide a response, the post-NLU ranker 465 only selects a skill 190 that provides the post-NLU ranker 465 with result data corresponding to a response, indicating further information is needed, or indicating multiple responses can be generated.

The post-NLU ranker 465 may select result data, associated with the skill 190 associated with the highest score, for output to the user. Alternatively, the post-NLU ranker 465 may output ranked output data indicating skills 190 and their respective post-NLU ranker rankings. Since the post-NLU ranker 465 receives result data, potentially corresponding to a response to the user input, from the skills 190 prior to post-NLU ranker 465 selecting one of the skills or outputting the ranked output data, little to no latency occurs from the time skills provide result data and the time the system outputs responds to the user.

If the post-NLU ranker 465 selects result audio data to be output to a user and the system determines content should be output audibly, the post-NLU ranker 465 (or another component of the system(s) 120) may cause the device 110*a* and/or the device 110*b* to output audio corresponding to the result audio data. If the post-NLU ranker 465 selects result text data to output to a user and the system determines content should be output visually, the post-NLU ranker 465 (or another component of the system(s) 120) may cause the device 110*b* to display text corresponding to the result text data. If the post-NLU ranker 465 selects result audio data to output to a user and the system determines content should be output visually, the post-NLU ranker 465 (or another component of the system(s) 120) may send the result audio data to the ASR component 150. The ASR component 150 may generate output text data corresponding to the result audio data. The system(s) 120 may then cause the device 110*b* to display text corresponding to the output text data. If the post-NLU ranker 465 selects result text data to output to a user and the system determines content should be output audibly, the post-NLU ranker 465 (or another component of the system(s) 120) may send the result text data to the TTS component 480. The TTS component 480 may generate output audio data (corresponding to computer-generated speech) based on the result text data. The system(s) 120 may then cause the device 110*a* and/or the device 110*b* to output audio corresponding to the output audio data.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 472 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 472 may associate a dialog session identifier with the dialog upon identifying that the user is engaging in a dialog with the user. The dialog manager component 472 may track a user input and the corresponding system generated response to the user input as a turn. The dialog session identifier may correspond to multiple turns of user input and corresponding system generated response. The dialog manager component 472 may transmit data identified by the dialog session identifier directly to the orchestrator component 130 or other component. Depending on system configuration the dialog manager 472 may determine the appropriate system generated response to give to a particular utterance or user input of a turn. Or creation of the system generated response may be managed by another component of the system (e.g., the language output component 493, NLG 479, orchestrator component 130, etc.) while the dialog manager 472 selects the appropriate responses.

Alternatively, another component of the system component(s) 120 may select responses using techniques discussed herein. The text of a system generated response may be sent to a TTS component 480 for creation of audio data corresponding to the response. The audio data may then be sent to a user device (e.g., device 110) for ultimate output to the user. Alternatively (or in addition) a dialog response may be returned in text or some other form.

The dialog manager 472 may receive the ASR hypothesis/hypotheses (i.e., text data) and make a semantic interpretation of the phrase(s) or statement(s) represented therein. That is, the dialog manager 472 determines one or more meanings associated with the phrase(s) or statement(s) represented in the text data based on words represented in the text data. The dialog manager 472 determines a goal corresponding to an action that a user desires be performed as well as pieces of the text data that allow a device (e.g., the device 110, the system component(s) 120, a skill 190, a skill support system(s) 125, etc.) to execute the intent. If, for example, the text data corresponds to "what is the weather," the dialog manager 472 may determine that that the system component(s) 120 is to output weather information associated with a geographic location of the device 110. In another example, if the text data corresponds to "turn off the lights," the dialog manager 472 may determine that the system component(s) 120 is to turn off lights associated with the device(s) 110 or the user(s) 105.

The dialog manager 472 may send the results data to one or more skill component(s) 190. If the results data includes a single hypothesis, the orchestrator component 130 may send the results data to the skill component(s) 190 associated with the hypothesis. If the results data includes an N-best list of hypotheses, the orchestrator component 130 may send the top scoring hypothesis to a skill component(s) 190 associated with the top scoring hypothesis.

The system component(s) 120 includes a language output component 493. The language output component 493 includes a natural language generation (NLG) component 479 and a text-to-speech (TTS) component 480. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480. Alternatively or in addition, the TTS component 480 may receive text data from a skill component 190 or other system component for output.

The NLG component 479 may include a trained model. The NLG component 479 generates text data (or other natural language representation data) from dialog data received by the dialog manager 472 such that the output text data has a natural feel and, in some embodiments, includes words and/or phrases specifically formatted for a requesting individual. The NLG component 479 may use templates to formulate responses, and/or the NLG component 479 may include models trained from the various templates for forming the output text data. For example, the NLG component 479 may analyze transcripts of local news programs, television shows, sporting events, or any other media program to obtain common components of a relevant language and/or region. As one illustrative example, the NLG component 479 may analyze a transcription of a regional sports program to determine commonly used words or phrases for describing scores or other sporting news for a particular region. The NLG component 479 may further receive, as inputs, a dialog history, an indicator of a level of formality, and/or a command history or other user history such as the dialog history.

The NLG component 479 may generate dialog data based on one or more response templates. Further continuing the example above, the NLG component 479 may select a template in response to the question, "What is the weather currently like?" of the form: "The weather currently is $weather_information$." The NLG component 479 may analyze the logical form of the template to produce one or more textual responses including markups and annotations to familiarize the response that is generated. In some embodiments, the NLG component 479 may determine which response is the most appropriate response to be selected. The selection may, therefore, be based on past responses, past questions, a level of formality, and/or any other feature, or any other combination thereof. Responsive audio data representing the response generated by the NLG component 479 may then be generated using the text-to-speech component 480.

The TTS component 480 may generate audio data (e.g., synthesized speech) from text data using one or more different methods. Text data input to the TTS component 480 may come from a skill component 190, the orchestrator component 130, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The device 110 may include image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 105 to request capture of image or video data. The device 110 may process the commands locally or send audio data 108 representing the commands to the system component(s) 120 for processing, after which the system component(s) 120 may return output data that can cause the device 110 to engage its camera.

Upon receipt by the system component(s) 120, the image data 421 may be sent to an orchestrator component 130. The orchestrator component 130 may send the image data 421 to an image processing component that can perform computer vision functions such as object recognition, modeling, reconstruction, etc. For example, the image processing component may detect a person, face, etc. (which may then be identified using user recognition component 495). The device 110 may also include its own image processing component.

In some implementations, the image processing component can detect the presence of text in an image. In such implementations, the image processing component can recognize the presence of text, convert the image data to text data, and send the resulting text data via the orchestrator component 130 to the language processing component 492 for processing by the NLU component 160.

The system component(s) 120 may include a user recognition component 495 that recognizes one or more users using a variety of data. However, the disclosure is not limited thereto, and the device 110 may include a user recognition component 595 instead of and/or in addition to user recognition component 495 of the system component(s) 120 without departing from the disclosure. User recognition component 595 operates similarly to user recognition component 495.

The user-recognition component 495 may take as input the audio data 108 and/or text data output by the ASR component 150. The user-recognition component 495 may perform user recognition by comparing audio characteristics in the audio data 108 to stored audio characteristics of users. The user-recognition component 495 may also perform user recognition by comparing biometric data (e.g., fingerprint data, iris data, etc.), received by the system in correlation with the present user input, to stored biometric data of users assuming user permission and previous authorization. The user-recognition component 495 may further perform user recognition by comparing image data (e.g., including a representation of at least a feature of a user), received by the system in correlation with the present user input, with stored image data including representations of features of different users. The user-recognition component 495 may perform additional user recognition processes, including those known in the art.

The user-recognition component 495 determines scores indicating whether user input originated from a particular user. For example, a first score may indicate a likelihood that the user input originated from a first user, a second score may indicate a likelihood that the user input originated from a second user, etc. The user-recognition component 495 also determines an overall confidence regarding the accuracy of user recognition operations.

Output of the user-recognition component 495 may include a single user identifier corresponding to the most likely user that originated the user input. Alternatively, output of the user-recognition component 495 may include an N-best list of user identifiers with respective scores indicating likelihoods of respective users originating the user input. The output of the user-recognition component 495 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 5:
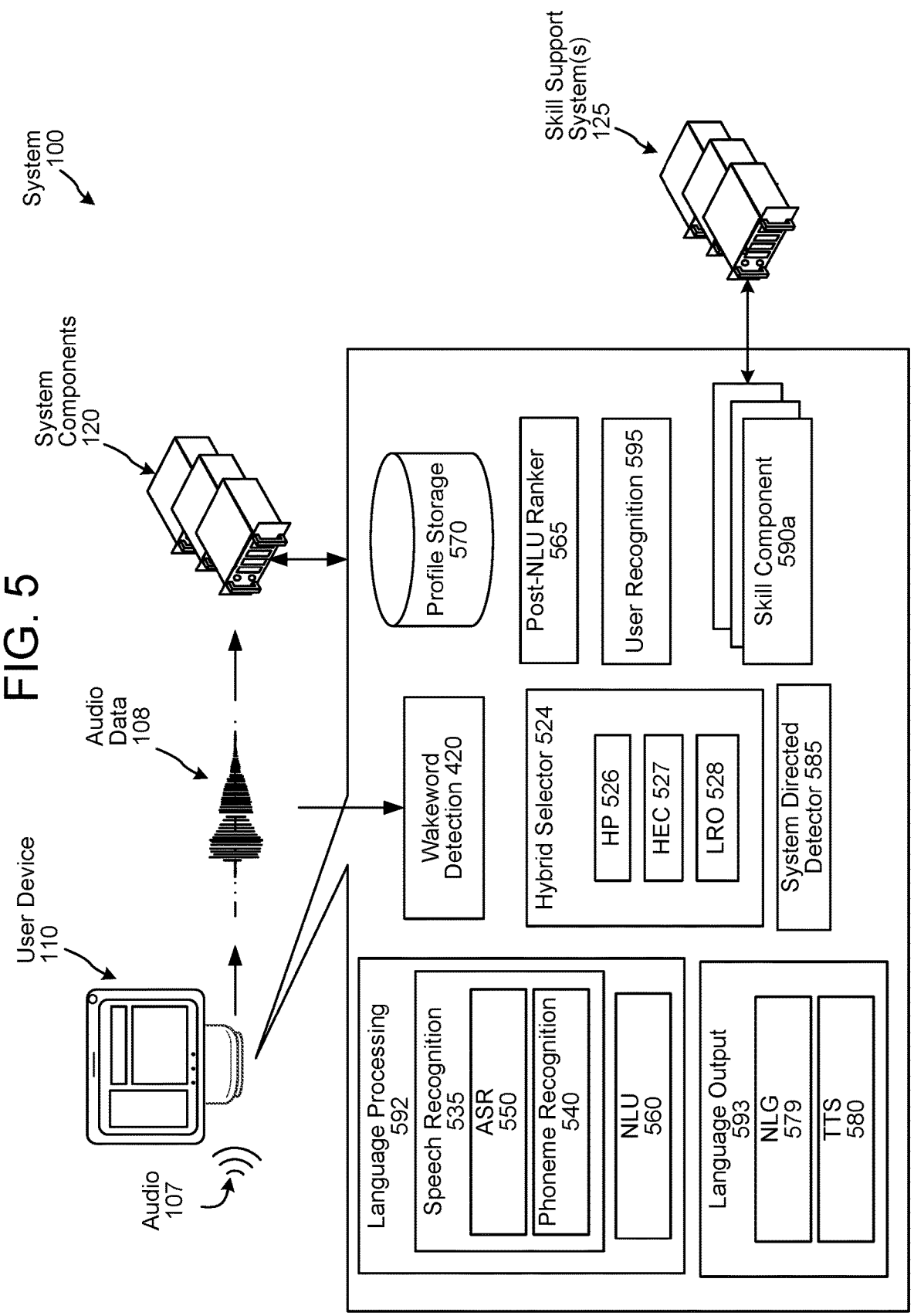
FIG. 5 is a conceptual diagram illustrating components that may be included in a device, according to embodiments of the present disclosure.

Although the components of FIG. 4 may be illustrated as part of system component(s) 120, user device 110, or otherwise, the components may be arranged in other device (s) (such as in user device 110 if illustrated in system component(s) 120 or vice-versa, or in other device(s) altogether) without departing from the disclosure. FIG. 5 illustrates such a configured user device 110.

In at least some embodiments, the system component(s) 120 may receive the audio data 108 from the device 110, to recognize speech corresponding to a spoken input in the received audio data 108, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

The device 110 may include a wakeword detection component 420 configured to compare the audio data 108 to stored models used to detect a wakeword (e.g., "Alexa") that indicates to the device 110 that the audio data 108 is to be processed for determining NLU output data (e.g., slot data that corresponds to a named entity, label data, and/or intent data, etc.). In at least some embodiments, a hybrid selector 524, of the device 110, may send the audio data 108 to the wakeword detection component 420. If the wakeword detection component 420 detects a wakeword in the audio data 108, the wakeword detection component 420 may send an indication of such detection to the hybrid selector 524. In response to receiving the indication, the hybrid selector 524 may send the audio data 108 to the system component(s) 120 and/or the ASR component 550. The wakeword detection component 420 may also send an indication, to the hybrid selector 524, representing a wakeword was not detected. In response to receiving such an indication, the hybrid selector 524 may refrain from sending the audio data 108 to the system component(s) 120, and may prevent the ASR component 550 from further processing the audio data 108. In this situation, the audio data 108 can be discarded.

The device 110 may conduct its own speech processing using on-device language processing components, such as an SLU/language processing component 592 (which may include a speech recognition component 535, an ASR component(s) 550, a phoneme recognition component(s) 540 and an NLU 560), similar to the manner discussed herein with respect to the language processing component 492 of the system component(s) 120. Language processing component 592 may operate similarly to language processing component 492, speech recognition component 535 may operate similarly to the speech recognition component 135, ASR component 550 may operate similarly to ASR component 150, phoneme recognition component 540 may operate similarly to the phoneme recognition component 140, and NLU component 560 may operate similarly to NLU component 160. The device 110 may also internally include, or otherwise have access to, other components such as one or more skill components 590 capable of executing commands based on NLU output data or other results determined by the device 110/system component(s) 120 (which may operate similarly to skill components 190), a user recognition component 595 (configured to process in a similar manner to that discussed herein with respect to the user recognition component 495 of the system component(s) 120), profile storage 570 (configured to store similar profile data to that discussed herein with respect to the profile storage 470 of the system component(s) 120), or other components. In at least some embodiments, the profile storage 570 may only store profile data for a user or group of users specifically associated with the device 110. Similar to as described above with respect to skill component 190, a skill component 590 may communicate with a skill support system(s) 125. The device 110 may also have its own language output component 593 which may include NLG component 579 and TTS component 580. Language output component 593 may operate similarly to language processing component 493, NLG component 579 may operate similarly to NLG component 479 and TTS component 580 may operate similarly to TTS component 480.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 524, of the device 110, may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 can be sent to the HEC 527 using the HP 526. The HP 526 may also be configured to allow the audio data 108 to pass to the system component(s) 120 while also receiving (e.g., intercepting) this audio data 108 and sending the audio data 108 to the HEC 527.

In at least some embodiments, the hybrid selector 524 may further include a local request orchestrator (LRO) 528 configured to notify the ASR component 550 about the availability of new audio data 108 that represents user speech, and to otherwise initiate the operations of local language processing when new audio data 108 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 108 is received, the HP 526 may allow the audio data 108 to pass through to the system component(s) 120 and the HP 526 may also input the audio data 108 to the on-device ASR component 550 by routing the audio data 108 through the HEC 527 of the hybrid selector 524, whereby the LRO 528 notifies the ASR component 550 of the audio data 108. At this point, the hybrid selector 524 may wait for response data from either or both of the system component(s) 120 or the local language processing components. However, the disclosure is not limited thereto, and in some examples the hybrid selector 524 may send the audio data 108 only to the local ASR component 550 without departing from the disclosure. For example, the device 110 may process the audio data 108 locally without sending the audio data 108 to the system component(s) 120.

The local ASR component 550 is configured to receive the audio data 108 from the hybrid selector 524, and to recognize speech in the audio data 108, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 160 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 105.

The device 110 and/or the system component(s) 120 may associate a unique identifier with each natural language user input. The device 110 may include the unique identifier when sending the audio data 108 to the system component(s) 120, and the response data from the system component(s) 120 may include the unique identifier to identify which natural language user input the response data corresponds.

In at least some embodiments, the device 110 may include, or be configured to use, one or more skill components 590 that may work similarly to the skill component(s) 190 implemented by the system component(s) 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

A "domain" may include various skills relating to a particular area of interest. For example, a music domain may include various skills that can respond to a user's request to play music, enable a user to purchase music, etc. In another example, a smart-home domain may include skills that enable a user to control various home devices. A domain may correspond to different intents and entities. For example, the music domain may correspond to a Play Music intent, Add to Playlist intent, etc. As another example, the smart-home domain may correspond to Turn On intent, Turn Off intent, etc.

Additionally or alternatively, the device 110 may be in communication with one or more skill support system(s) 125. For example, a skill support system(s) 125 may be located in a remote environment (e.g., separate location) such that the device 110 may only communicate with the skill support system(s) 125 via the network(s) 199. However, the disclosure is not limited thereto. For example, in at least some embodiments, a skill support system(s) 125 may be configured in a local environment (e.g., home server and/or the like) such that the device 110 may communicate with the skill support system(s) 125 via a private network, such as a local area network (LAN).

As used herein, a "skill" may refer to a skill component 590, a skill support system(s) 125, or a combination of a skill component 590 and a corresponding skill support system(s) 125.

Similar to the manner discussed with regard to FIG. 4, the local device 110 may be configured to recognize multiple different wakewords and/or perform different categories of tasks depending on the wakeword. Such different wakewords may invoke different processing components of local device 110 (not illustrated in FIG. 5). For example, detection of the wakeword "Alexa" by the wakeword detection component 420 may result in sending audio data to certain language processing components 592/skills 590 for processing while detection of the wakeword "Computer" by the wakeword detector may result in sending audio data different language processing components 592/skills 590 for processing.

One or more of the herein described system component(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 6:
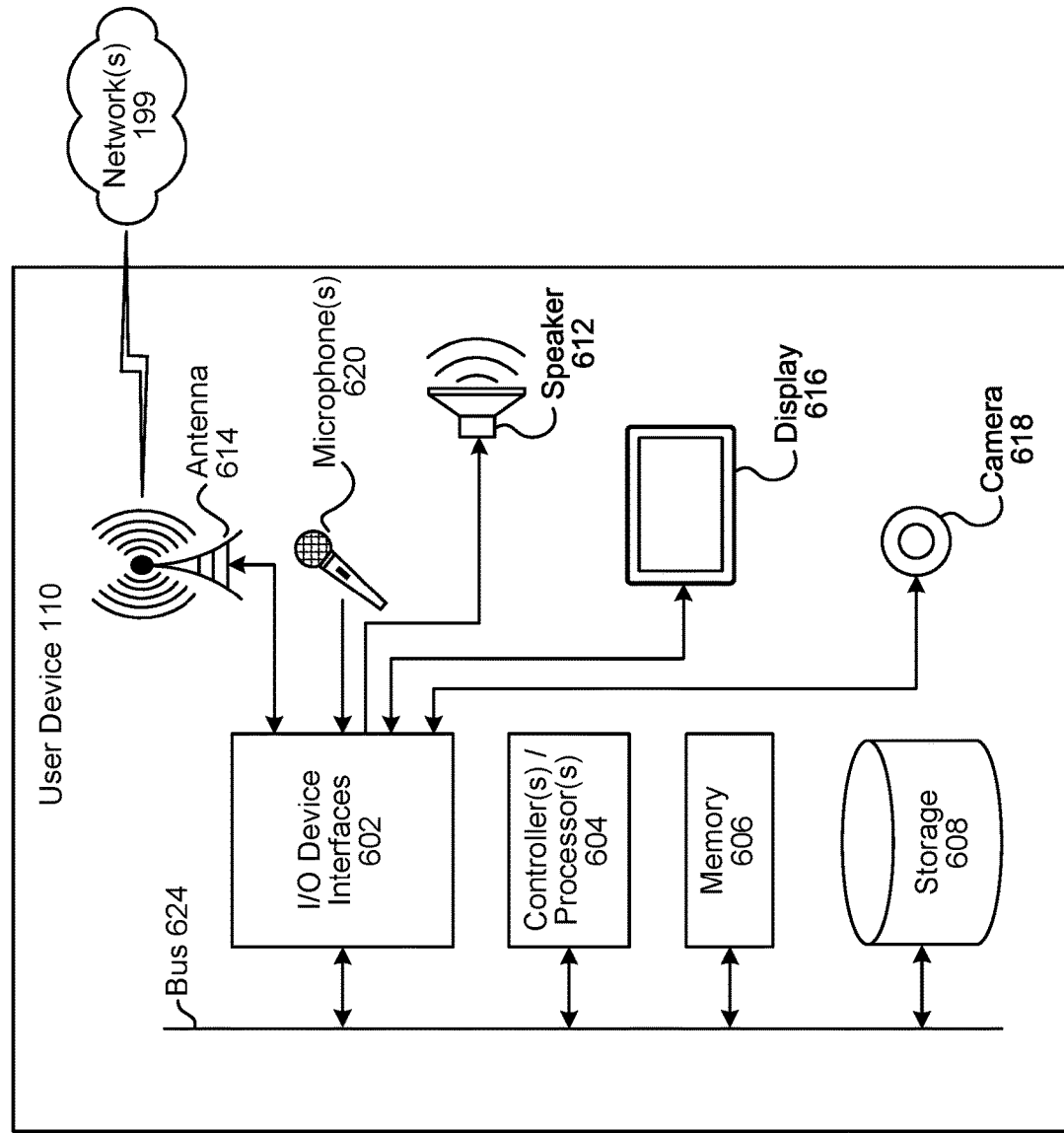
FIG. 6 is a block diagram conceptually illustrating example components of a device according to embodiments of the present disclosure.
Figure 7:
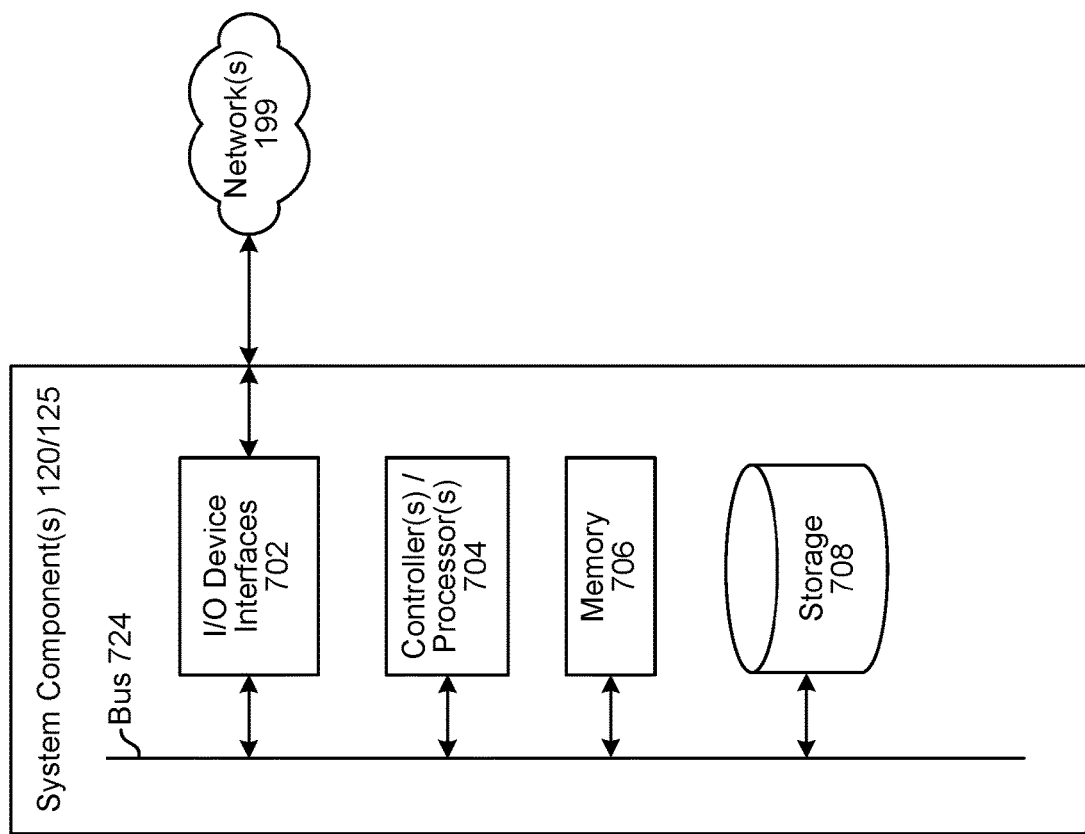
FIG. 7 is a block diagram conceptually illustrating example components of a system according to embodiments of the present disclosure.

FIG. 6 is a block diagram conceptually illustrating a device 110 that may be used with the system. FIG. 7 is a block diagram conceptually illustrating example components of a remote device, such as the system component(s) 120, which may assist with ASR processing, NLU processing, etc., and the skill support system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more system components 120 for performing ASR processing, one or more system components 120 for performing NLU processing, one or more skill support system(s) 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (602/702).

Computer instructions for operating each device (110/120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the system component(s) 120, or the skill support system(s) 125 may include their own dedicated processors, memory, and/or storage. Alternatively, one or more of the components of the device(s) 110, the system component(s) 120, or the skill support system(s) 125 may utilize the I/O interfaces (602/702), processor(s) (604/704), memory (606/706), and/or storage (608/708) of the device(s) 110 system component(s) 120, or the skill support system(s) 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill support system(s) 125, as described herein, are illustrative, and may be located as a stand-alone device or may be included, in whole or in part, as a component of a larger device or system.

Figure 8:
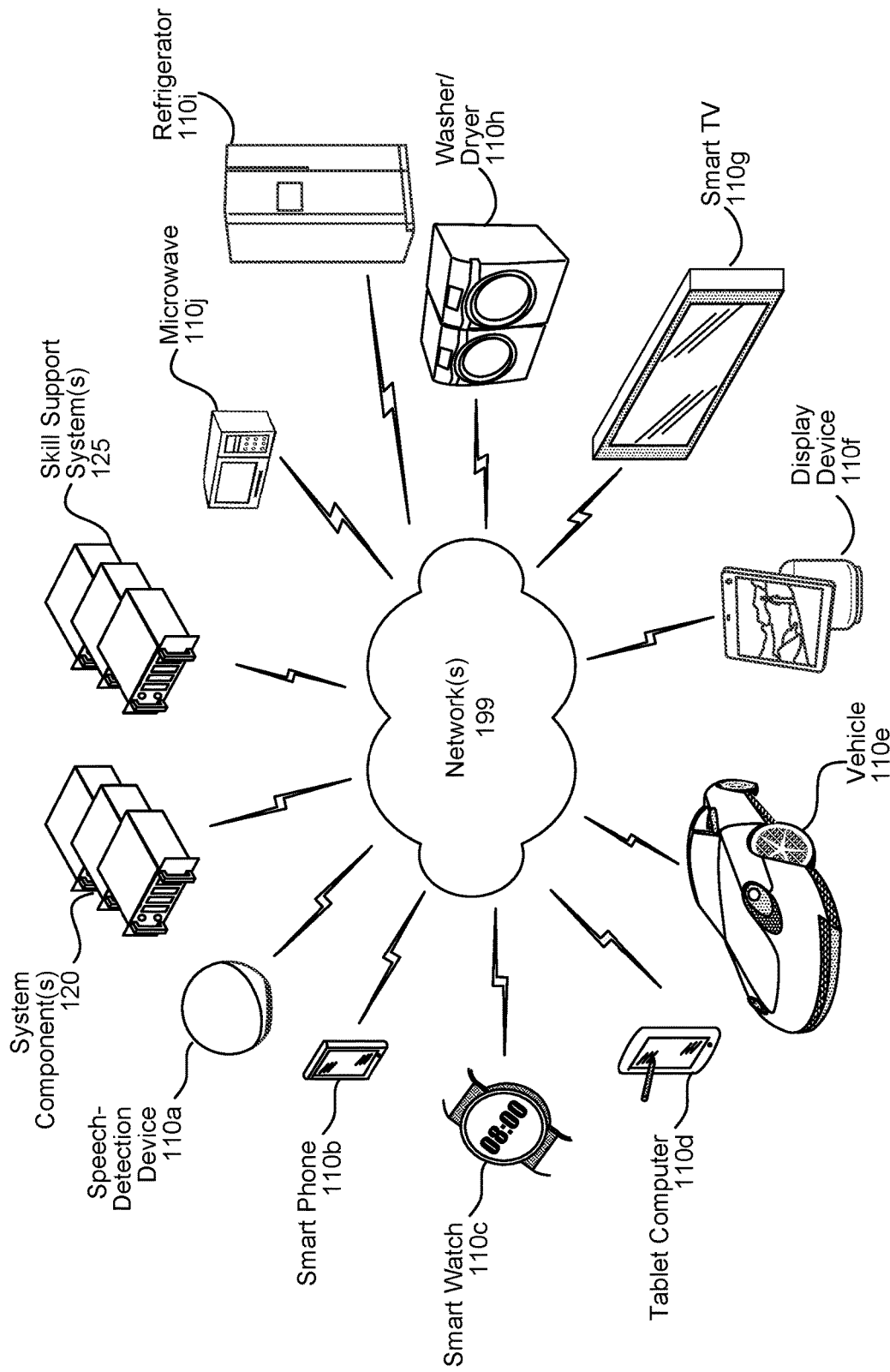
FIG. 8 illustrates an example of a computer network for use with the speech processing system.

As illustrated in FIG. 8, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system component(s) 120, the skill support system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of one or more system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   causing presentation of first output data representing a prompt for a user to speak a first word in a learning language that the user is learning using a language learning skill component;
   receiving, after causing presentation of the first output data, first input audio data corresponding to a first spoken input;
   processing, using an automatic speech recognition (ASR) component configured for a device language different from the learning language, the first input audio data to determine first ASR data representing a transcription of the first spoken input in the device language, wherein the device language is a native language for the user;
   processing, using a phoneme recognition component configured for the learning language, the first input audio data to determine first phoneme data representing phonemes of the first spoken input in the learning language;
   processing, using a natural language understanding (NLU) component, the first ASR data and the first phoneme data to determine first intent data representing the first spoken input corresponds to a command in the device language;
   processing the first intent data to determine second output data responsive to the first spoken input; and
   causing presentation of the second output data.

2. The computer-implemented method of claim 1, further comprising:
   receiving second input audio data corresponding to a second spoken input including at least a second word;
   processing, using the ASR component, the second input audio data to determine second ASR data;
   processing, using the phoneme recognition component, the second input audio data to determine second phoneme data;
   processing, using the NLU component, the second ASR data and the second phoneme data to determine second intent data representing the second spoken input is a user attempt to pronounce the at least second word in the learning language;
   processing, using a language learning skill component, the second phoneme data with respect to reference phoneme data corresponding to the at least second word to determine a similarity between the second phoneme data and the reference phoneme data;
   determining, based at least in part on the similarity, third output data indicating feedback with respect to pronunciation of the at least second word in the learning language; and
   causing presentation of the third output data in response to the second spoken input.

3. The computer-implemented method of claim 1, further comprising:
   receiving context data including a first indicator of the learning language and a second indicator of the device language, the first indicator being provided by the language learning skill component and the second indicator being stored in profile data corresponding to a device that generated the first input audio data;
   based on the first indicator, selecting the phoneme recognition component, from a plurality of phoneme recognition components, to process the first input audio data, wherein the plurality of phoneme recognition components comprises a second phoneme recognition component configured for a third language; and
   based on the second indicator, selecting the ASR component, from a plurality of ASR components, to process the first input audio data, wherein the plurality of ASR components comprises a second ASR component configured for a fourth language.

4. The computer-implemented method of claim 1, wherein processing using the NLU component further comprises:
   determining that the first ASR data includes a first confidence score satisfying a first condition indicative of the first spoken input being in the device language;
   determining that the first phoneme data includes a second confidence score failing a second condition indicative of the first spoken input being in the learning language; and
   based on the first confidence score satisfying the first condition and the second confidence score failing the second condition, determining that the first spoken input corresponds to the command in the device language.

5. A computer-implemented method comprising:
   receiving first input audio data corresponding to a first spoken input;
   determining, using an automatic speech recognition (ASR) component and the first input audio data, first ASR data representing a transcription of the first spoken input in a device language;
   determining, using a phoneme recognition component and the first input audio data, first phoneme data representing phonemes of the first spoken input in a learning language;
   determining, using the first ASR data, that the first spoken input corresponds to a command in the device language;
   based on the first spoken input corresponding to the command in the device language, determining first output data responsive to the command; and
   causing presentation of the first output data.

6. The computer-implemented method of claim 5, further comprising:
  receiving second input audio data corresponding to a second spoken input including at least a first word;
  determining, using the ASR component and the second input audio data, second ASR data;
  determining, using the phoneme recognition component and the second input audio data, second phoneme data;
  determining, using the second ASR data, that the second spoken input corresponds to a user attempt to pronounce the at least the first word in the learning language;
  determining, using the second phoneme data and reference phoneme data corresponding to the at least the first word, second output data indicating feedback with respect to pronunciation of the at least the first word; and
  causing presentation of the second output data.

7. The computer-implemented method of claim 6, wherein determining that the second spoken input corresponds to a user attempt to pronounce the at least the first word in the learning language comprises:
  determining that the second ASR data includes a confidence score failing a condition indicative of the first spoken input being in the device language; and
  based on the confidence score failing the condition, determining that the second spoken input corresponds to a user attempt to pronounce the at least the first word in the learning language.

8. The computer-implemented method of claim 5, wherein determining that the first spoken input corresponds to the command in the device language comprises:
  determining that the first ASR data includes a confidence score satisfying a condition indicative of the first spoken input being in the device language; and
  based on the confidence score satisfying the condition, determining that the first spoken input corresponds to the command in the device language.

9. The computer-implemented method of claim 5, further comprising:
  receiving a first indicator of the device language; and
  based on the first indicator, selecting, from a plurality of ASR components, the ASR component to process the first input audio data.

10. The computer-implemented method of claim 5, further comprising:
  receiving a second indicator of the learning language; and
  based on the second indicator, selecting, from a plurality of phoneme recognition components, the phoneme recognition component to process the first input audio data.

11. The computer-implemented method of claim 5, further comprising:
  determining that the first spoken input corresponds to a language learning skill component;
  determining that the language learning skill component is included in a list of skill components approved to receive phoneme data; and
  in response to the language learning skill component being included in the list, processing the first input audio data using the phoneme recognition component.

12. The computer-implemented method of claim 5, further comprising:
  receiving second input audio data corresponding to a second spoken input including at least a first word;
  determining, using the ASR component and the second input audio data, second ASR data;
  determining, using the phoneme recognition component and the second input audio data, second phoneme data;
  determining that the second ASR data corresponds to an error;
  determining speech recognition data including the second phoneme data and excluding the second ASR data;
  based on the speech recognition data including the second phoneme data, determining that the second spoken input corresponds to a user attempt to pronounce the at least the first word in the learning language;
  determining second output data indicating feedback with respect to pronunciation of the at least the first word; and
  causing presentation of the second output data.

13. A system comprising:
at least one processor; and
at least one memory including instructions that, when executed by the at least one processor, cause the system to:
  receive first input audio data corresponding to a first spoken input;
  determine, using an automatic speech recognition (ASR) component and the first input audio data, first ASR data representing a transcription of the first spoken input in a device language;
  determine, using a phoneme recognition component and the first input audio data, first phoneme data representing phonemes of the first spoken input in a learning language;
  determine, using the first ASR data, that the first spoken input corresponds to a command in the device language;
  based on the first spoken input corresponding to the command in the device language, determine first output data responsive to the command; and
  cause presentation of the first output data.

14. The system of claim 13, wherein the instructions that, when executed by the at least one processor, cause the system to:
  receive second input audio data corresponding to a second spoken input including at least a first word;
  determine, using the ASR component and the second input audio data, second ASR data;
  determine, using the phoneme recognition component and the second input audio data, second phoneme data;
  determine, using the second ASR data, that the second spoken input corresponds to a user attempt to pronounce the at least the first word in the learning language;
  determine, using the second phoneme data and reference phoneme data corresponding to the at least the first word, second output data indicating feedback with respect to pronunciation of the at least the first word; and
  cause presentation of the second output data.

15. The system of claim 14, wherein the instructions that cause the system to determine that the second spoken input corresponds to a user attempt to pronounce the at least the first word in the learning language further cause the system to:
  determine that the second ASR data includes a confidence score failing a condition indicative of the first spoken input being in the device language; and
  based on the confidence score failing the condition, determine that the second spoken input corresponds to a user attempt to pronounce the at least the first word in the learning language.

16. The system of claim 13, wherein the instructions that cause the system to determine that the first spoken input corresponds to the command in the device language further causes the system to:
- determine that the first ASR data includes a confidence score satisfying a condition indicative of the first spoken input being in the device language; and
- based on the confidence score satisfying the condition, determine that the first spoken input corresponds to the command in the device language.

17. The system of claim 13, wherein the instructions that, when executed by the at least one processor, further cause the system to:
- receive a first indicator of the device language; and
- based on the first indicator, select, from a plurality of ASR components, the ASR component to process the first input audio data.

18. The system of claim 13, wherein the instructions that, when executed by the at least one processor, further cause the system to:
- receive a second indicator of the learning language; and
- based on the second indicator, select, from a plurality of phoneme recognition components, the phoneme recognition component to process the first input audio data.

19. The system of claim 13, wherein the instructions that, when executed by the at least one processor, further cause the system to:
- determine that the first spoken input corresponds to a language learning skill component;
- determine that the language learning skill component is included in a list of skill components approved to receive phoneme data; and
- in response to the language learning skill component being included in the list, process the first input audio data using the phoneme recognition component.

20. The system of claim 13, wherein the instructions that, when executed by the at least one processor, further cause the system to:
- receive second input audio data corresponding to a second spoken input including at least a first word;
- determine, using the ASR component and the second input audio data, second ASR data;
- determine, using the phoneme recognition component and the second input audio data, second phoneme data;
- determine that the second ASR data corresponds to an error;
- determine speech recognition data including the second phoneme data and excluding the second ASR data;
- based on the speech recognition data including the second phoneme data, determine that the second spoken input corresponds to a user attempt to pronounce the at least the first word in the learning language;
- determine second output data indicating feedback with respect to pronunciation of the at least the first word; and
- cause presentation of the second output data.

* * * * *